United States Patent [19]
Wallace et al.

[11] 3,795,916
[45] Mar. 5, 1974

[54] PROCESS OPERATION ERROR MONITOR AND ERROR MESSAGE SYSTEM

[75] Inventors: Frank E. Wallace, Irwin; Anthony D. Deramo, Swissvale, both of Pa.

[73] Assignee: Westinghouse Electric Corporation, Pittsburgh, Pa.

[22] Filed: Nov. 14, 1969

[21] Appl. No.: 876,793

[52] U.S. Cl.............. 444/1, 235/151.1, 235/150.1, 235/151.3
[51] Int. Cl........................ G06f 15/46, G06f 15/06
[58] Field of Search................ 235/150, 151, 151.1; 340/146.1, 213; 343/5, 17.1, 17.7

[56] References Cited
UNITED STATES PATENTS

| | | | |
|---|---|---|---|
| 3,400,374 | 9/1968 | Schumann | 235/151.1 X |
| 3,396,368 | 8/1968 | Lakhani | 340/146.1 |

OTHER PUBLICATIONS

Application of the Prodac 50 System to Direct Digital Control; by J. C. Belz, G. J. Kirk, and P. S. Radcliffe: 1965 IEEE Intl. Conv. Recl, Part 3, pp. 102-122, March 1965

Program Organization of a Process Comtrol Computer for Rolling Mill Applications; by J. S. Deliyannides, G. S. Rambo, and A. H. Green; 1965 IEEE Intl. Conv. Rec., Part 3, pp. 261–265, March 1965

Primary Examiner—Eugene G. Botz
Assistant Examiner—Edward J. Wise
Attorney, Agent, or Firm—F. H. Henson; R. G. Brodahl

[57] ABSTRACT

There is here disclosed a method and apparatus for monitoring predetermined happenings, such as defined errors, which occur during the operation of a dynamic process, for example a metallic strip rolling mill. The dynamic process is sequentially operative in a chain of functional units, each of which includes a defined input event and at least one defined response event. In addition, there may be one or more defined input variables associated with that input event and one or more defined response variables associated with each of those response events. An error monitor operation is provided whereby operational checks are established for at least one of a maximum time interval $T_{max}$ and/or a minimum time interval $T_{min}$ for each response event, and a maximum amplitude $A_{max}$ and/or a minimum amplitude $A_{min}$ relative to each of the defined response variables. A software program is disclosed for operation with a general purpose digital computer to effect a special purpose control computer entity for the purpose of accomplishing the desired error monitor function as well as providing output indications and/or process operation corrections where some defined error condition is found to have occurred.

36 Claims, 17 Drawing Figures

INVENTORS
Frank E. Wallace &
Anthony D. Deramo.
BY
ATTORNEY

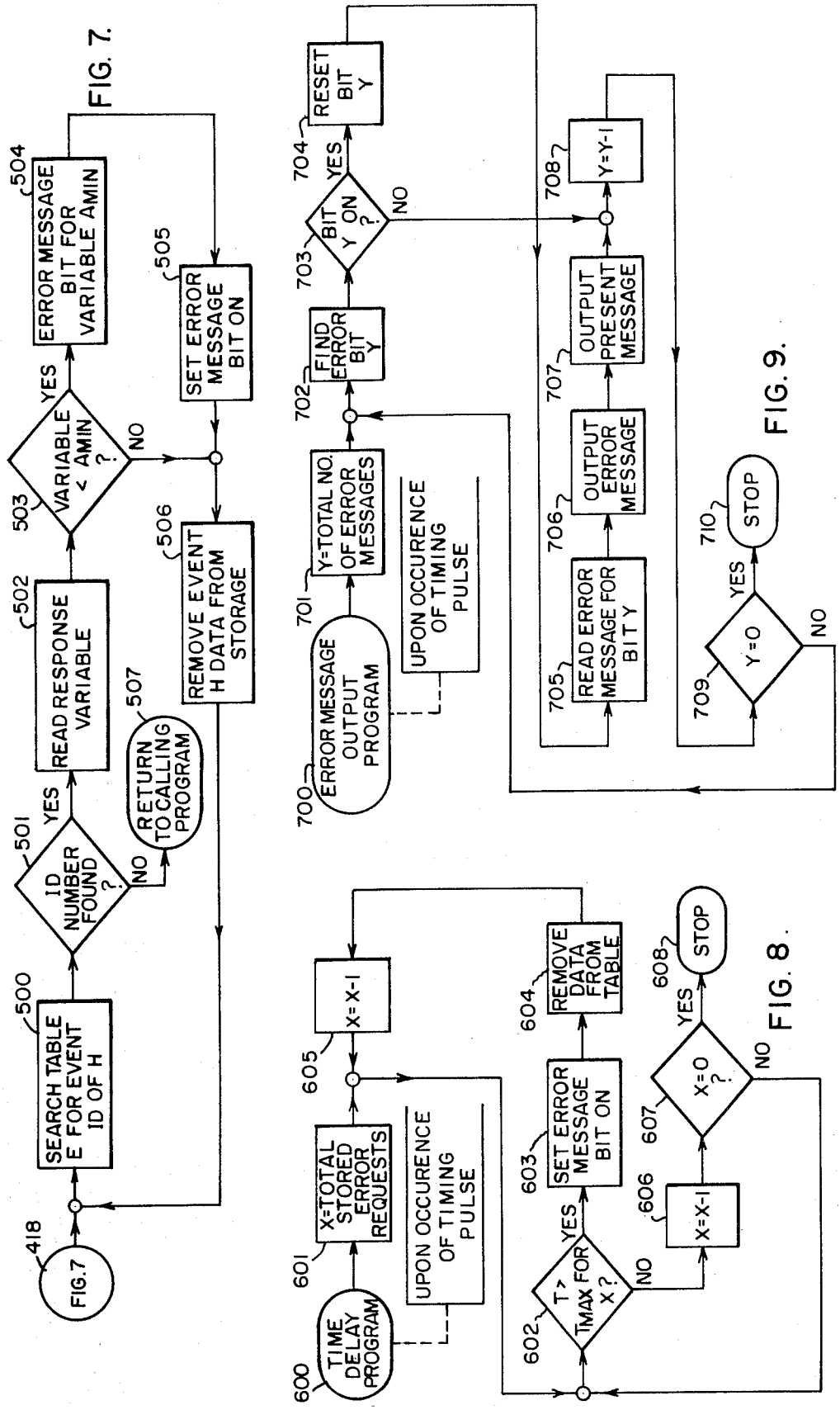

| FUNCTIONAL UNIT | INPUT EVENT | INPUT VARIABLES | RESPONSE EVENTS | RESPONSE VARIABLES |
|---|---|---|---|---|
| 1 RUN IN TABLE 1<br>HM1<br>HM2 | HM1 ON | NONE | HM2 ON | NONE |
| 2 MILL LOAD CELL<br>POSITION DETECTOR<br>HM2, HM3 | HM2 ON | $S_1$ AT HM2 ON<br>$S_2$ AT HM2 ON | INTERRUPT $IS_1$<br>INTERRUPT $IS_2$<br>HM3 ON | FORCE $F_1$<br>$S_2$ AT $IS_2$<br>NONE |
| 3 RUN OUT TABLE 2<br>HM3<br>HM4 | HM3 ON | NONE | HM4 ON | NONE |

FIG. 11.

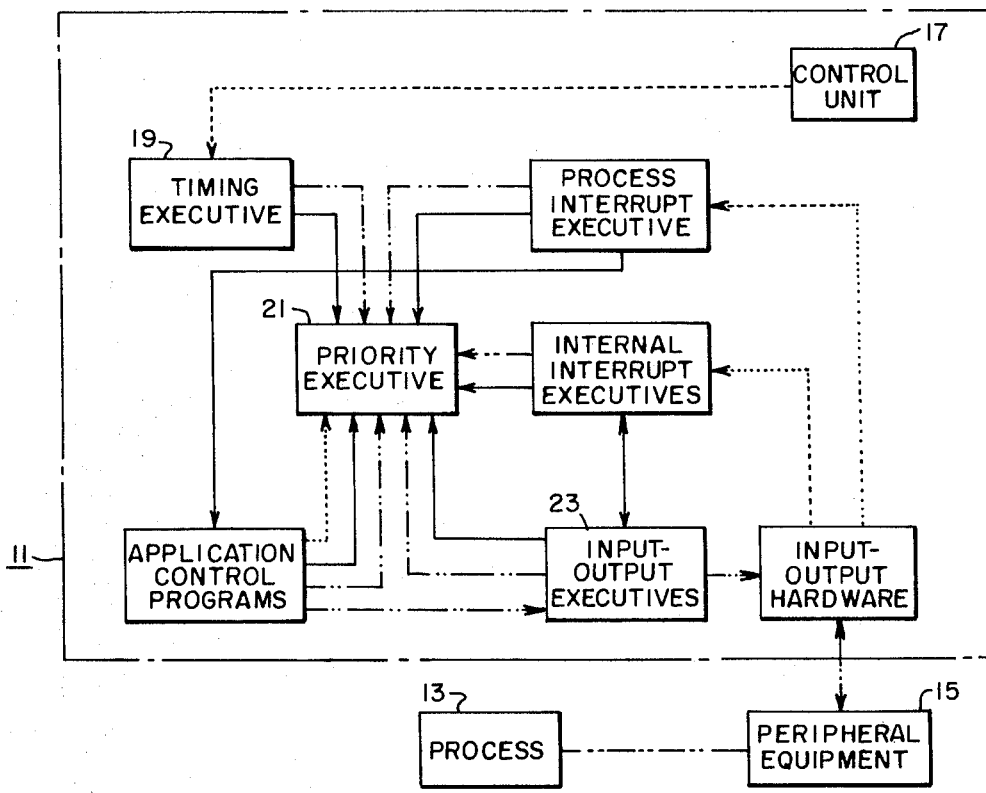

NOTE:
PROGRAM CONTROL TRANSFER — — —
INTERRUPT ACTIVATION ⋯⋯⋯⋯
INFORMATION TRANSFER ―――

FIG. 12.

PROCESS OPERATION ERROR MONITOR AND ERROR MESSAGE SYSTEM

BACKGROUND OF THE INVENTION

The dynamic process operation can be separated into hardware and software portions. The extent of each portion is largely determined by the scope and sophistication of the hardware control equipment. The software is designed around this hardware in relation to these basic hardware functions and the overall process control requirements. In this software design, there are two basic approaches which are usually taken:

1. In the first approach, it can be assumed that the dynamic process is operating properly, and no consideration is made for error happenings. Each hardware event relates to the actual hardware process, such as a hot metal detector or workpiece sensor device, and has strictly specified properties. The signals for each hardware event are discrete signals, as normally though of because the computer works as a discrete time device, so the discrete pressductor ON signal would be one such output signal for the latter example. This prior art control design approach previously made no provision for dynamic process operation error, but just considered that each sequential happening occurred and there was no random error factor in the process operation. The end result was a dynamic process control that could function effectively only in an error free environment. One problem in first setting up the prior art process control apparatus was that when some operational error or malfunction occurred it was never really known what it was, hardware or software, and if the human operator would stop the dynamic process operation, he might never really know what had gone wrong.

2. In the second approach, it was considered that a permissible error may not impair the operation of the dynamic process. An assumption is made that errors will occur, and an effort will then be made to correct whatever errors are identified and suitable recovery is provided for these errors. This could be very complex and expensive to program. For example, a slight percentage error in the amplitude of some output signal of 2 percent or even 5 percent, or a small time delay in the occurrence of this signal, may not matter. But if the time delay is for one or more minutes, in certain cases it can cause the whole operational process to fail. If there are such cases, then software recovery can be designed to eliminate the effects of these errors in the dynamic process. But in cases like that, a horrible mess can be gotten into because of all possible error combinations that can occur, so in most cases this approach is not too practical.

Most successful digital computer controlled dynamic process installations have taken an approach midway between the above two approaches. Approach (1) is an error-free environment and approach (2) is with error including some effort made to compensate for that error. Approach (1) is not generally practical because the operational environment of a typical process operation can be extremely hostile to the proper functioning of the control hardware; extremes of heat, pressure and humidity are common, such that errors of process operation will occur, and process control philosophy must take these error situations into account. On the other hand, approach (2) is not generally practical because of the extreme complexity of suitable recovery from errors in process operation control. In other words, an assumption is made that error will occur in the operation, and an attempt will be made through programming for desired recovery. For approach (2) the available mass memory can be filled up with all of the error happenings and still no reasonable determination is established about what corrections need to be made and in what order of importance.

A digital process control computer cna include a central integrated process control or setup processor operative with a software sequentially stepped instruction program which is entered into and stored within the storage memory unit of the computer, and including associated input and output equipment such as generally described in an article entitled "Understanding Digital Computer Process Control" by B. H. Murphy, which appeared in Automation for January 1965, pages 71 to 76, and in an article entitled "Small Control Computers — A new Concept" by F. G. Willard which appeared in the Westinghouse Engineer for November 1964 at pages 174 to 179. Two other articles of interest here in regard to the programming of a process control computer should also be noted; one was published in the January 1965 Westinghouse Engineer at pages 13 to 19 to Paul E. Lego and the other was published in the 1966 Iron and Steel Engineer Year Book at pages 328 to 334 by J. S. Deliyannides and A. H. Green. Each computer processor is associated with predetermined input systems not specifically shown, which typically include an input system which scans process signals representing the status of various process operating conditions, a conventional analog input system which scans and converts process analog signals and operator controlled and other input devices and systems which could include paper tape, teletypewriter and dial input apparatus. Various kinds of information are entered into the computer control system through information input devices including for the example of a rolling mill, the desired strip delivery gage, grade of steel being rolled, any selected workpiece plasticity tables, hardware oriented programs and control programs for the programming system and so forth. The input system interfaces the computer control system with the process through the medium of measured or detected signals. To effect desired control actions, control devices are operated directly by means of output system or by means of analog signals derived from the output system through a digital to analog converter. One such control action outputs from the computer control system the stand screwdown positioning command signals which are applied to the respective screwdown positioning regulator for each stand or stands of a rolling mill to determine the operation of the screwdown motor for desired screw positional movement at each stand. The previously determined mill spring modulus for each stand is stored in memory along with the calculated values of delivery height, theoretical length, length correction, change in offset, the offset deviation and the various other determined values. The calculated offset signal is sent to the screwdown position regulator to correct for the positional error of the associated screw apparatus for each stand. A suitable output display can be provided for operation with the computer control system in order to keep the process operator generally informed about the process operation and in order to signal the operator regarding an event or condition relative to any particular stand which may require some action on his part.

The use of an on-line digital computer control system requires that one or more model equations relating to the controlled process be stored in the memory unit of the computer to enable predictive operation and control of the process and adaptive control of the process relative to updating information obtained from actual operation of the process. For the example of a rolling mill, to permit a prediction of each stand roll force, relative to a given workpiece having a known grade, a suitable model equation is used to predict the roll force for each stand, and in relation to the desired reduction to be made in each stand, the unloaded roll opening is predicted for each stand. This general information is already known by persons skilled in this art and is covered by several publications; for example, in the Iron and Steel Engineering Yearbook for 1962 at pages 587 to 592 is an article by A. W. Smith and L. P. Gripp dealing with this subject matter, and two more articles of interest can be found in the Iron and Steel Engineering Yearbook for 1965 at pages 461 to 467 by R. G. Schultz and A. W. Smith and pages 468 to 475 by D. R. Jones and A. W. Smith. A further publication of interest here to illustrate the rolling mill computer control environment in which the teachings of the present invention could be utilized can be found in the Westinghouse Engineer for January 1969, pages 2 through 8 by John W. Wallace and is entitled "Integrated Process Control Rolls Steel More Efficiently."

SUMMARY OF THE PRESENT INVENTION it is feasible to functionally specify any dynamic process, for example a metallic strip rolling mill controlled by a programmed digital computer control system, in relation to an input event in each of predetermined and defined functional areas or units and at least one output or response event from each such unit. A programmed digital computer control system can include a hardware portion and a software portion, which are operative in a chain of sequential events or functional units. For the purpose to establish and identify some operational unit failure, the combination of the dynamic process and the control system can be separated into a hardware and software functional unit; in general, for process control applications utilizing a general purpose digital computer, the hardware design is generally established in advance and is rather difficult to change, and for this reason it is easier to change the software instruction program operative with such a general purpose computer. By taking the hardware environment as it has been established and currently exists, an effort is made to see what can be done to minimize the adverse effects of any hardware failure; this is done by identifying any failure of functional happenings that can be reasonably specified, such as the failure of any happening that can be predetermined and defined as the response to a certain input event. These input events can be any signals that come in off the hardware or software interface, such as interrupt signals, force readings, analog signals, and any other desired signal that can be read from the external world by the digital computer or central processing unit, as well as any defined program operation. Each such input event determines a functional unit specification.

For the example of a heated workpiece moving under a hot metal detector and going into a rolling mill stand having a roll force pressductor, by advance determination of the functional unit input-output sequence, if the hot metal detector ahead of the mill stand provides an ON signal at a certain time, since the velocity of the workpiece moving toward the mill stand is known from the monitored table speed, the time of the subsequent pressductor ON signal can be predicted. This of course assumes that the workpiece stays on the mill table and no other such error occurs, and since the time note is made of when the hot metal detector ON interrupt signal occurred, if the pressductor ON interrupt signal does not occur within a certain established maximum time, an error situation is assumed to have occurred.

An overview can be taken of the entire dynamic process operation and considered as a defined sequential operating entity including an identified series of functional unit interacting blocks such that there can be specified the functional input and output signal properties of each such discrete unit, and an error monitor can be used to check each such functionally defined unit. This checking operation is undertaken in regard to predetermined characteristic operations of the monitored process, such as response variable amplitudes and response event time occurrences. One example would be to check for the maximum time of the occurrence of response events relative to each input event. For example, the input-output signal relationship for the previous example is the input event signal when the hot metal detector ON signal is provided, and the associated response event signal would be the pressductor ON signal. The error monitor operates to document the occurrence of every monitored error that occurs in the process operation and that can be defined in this way and possibly provides software recovery. When the hot metal detector provides an ON signal, the error monitor sends out a request for an error message to be displayed by some output device at an appropriate time if a pressductor ON signal error has not occurred by some future time. Such an error would not in fact occur until there was not received the associated pressductor ON signal within that established time interval. If this time interval is established to be $\Delta T$, when the functional unit operates as desired regarding maximum time occurrence, one of these error alarm signals is requested for output after a time delay but not actually printed.

Every time a defined input event occurs for a specified functional unit, and if a maximum time check is to be made at least one appropriate error message is bid for to be output at some future time; and this future time is the time after which it has been established that a maximum time failure or error in operation has occurred in that particular functional unit. If $\Delta T$ is the maximum time interval established for the workpiece to go from the hot metal detector to the pressductor, there is sent out an error message request at the occurrence of the input event hot metal detector ON signal and then after this predetermined time interval $\Delta T$, a check is made to see if the response event pressductor ON signal has occurred. When the input event hot metal detector ON signal occurs this bid or request is made for an error message to be output, and then the proper received response event signal within time interval $\Delta T$ stops this bid. When there is received the proper response event pressductor ON interrupt signal within time interval $\Delta T$, this bid for an error message is cancellled, and no error message goes out.

The error monitor operation provided here is operative such that each defined functional unit of the dynamic process can be specified in the relationship of at least one of a maximum and/or a maximum time delay and a minimum and/or a maximum response variable amplitude signal. In other words, the software design proceeds on the basis of these discrete identified functional unit input event and related response event happenings. An assumption is made that when the initial input event signal occurs, the related response event signal or signals must occur in an established manner or the monitored process is not operating as desired.

In accordance with the teachings of the present invention each functional unit that is believed to warrant the effort is identified or defined as a discrete functional unit, and then a software error program monitors that each such defined functional unit operates as desired, and so forth. In this manner there is provided a way of monitoring the satisfactory operation of the whole dynamic process in relation to the operation of each identified functional unit. The error monitor program in this way follows the desired sequence of functional unit events and the values of associated response variables and establishes whenever a failure in one or more of them has occurred. Further, by the fact that the time of each event happening is monitored in relation to established time units and each variable in relation to established value limits, the associated output device such as a printer is able to provide printed engineering data and error alarms. In an effort to more or less monitor everything that is desired to be monitored, each discrete functional unit of the entire process has specified input-output signal properties, and if these properties are not followed within established bounds an error condition exists which could include hardware failure, software failure, maintenance failure, the human operator pulling some lever at a given time and so forth. The signals coming over the hardware interface as well as software generated signals, are the signals from the identified functional units.

Suppose after the provision of an input event signal, something fails in regard to the associated functional unit of the process operation, and there is not provided a related output response event signal. The requested or bid for maximum time error message would not be stopped by the desired occurrence of the response event signal within the established time interval. The maximum time error message would be printed to alarm the occurrence of the error condition.

The present invention includes the concept of identified discrete functional units in relation to input event happenings, and if the related functional unit response event happenings do not occur within the desired interval of time and the response variables are not within the desired range of magnitude, there is provided an alarm indication and/or process operation correction. For every functional unit defined in this manner at any given time, an error condition will be indicated.

The software can be designed to undertake a monitoring function relative to each input event over all desired response happenings associated with that input event and compare them to idealized response happenings. When any operational error condition established by this comparison reaches a sufficient magnitude to exceed defined error limits, and appropriate error condition will be indicated and which elements in identified functional units are causing the error situation. A software response, if feasible, and/or human response can then be made to correct the error conditions. This approach has several unique advantages:

1. It provides an improved monitor of every defined error condition such that it is better known and documented,
2. The source of hardware or software malfunction can be better determined from the error message and more readily corrected,
3. Confidence in computer operation is improved, since every unexpected defined error occurrence is explained, and
4. Process operational production losses are minimized, since defined error conditions can be better identified and corrected more quickly.

The present invention will become more apparent from the following exemplary embodiment detailed description in conjunction with the attached drawings.

BRIEF DESCRIPTION OF THE DRAWINGS

FIG. 7 illustrates a suitable logic flow chart program operative with the program of FIG. 6 to check for any $A_{min}$ error relative to response variables for a given input event I;

FIG. 8 illustrates a suitable logic flow chart program for checking a maximum time response error periodically as determined by a time pulse from a clock within the process control computer;

FIG. 9 illustrates a suitable logic flow chart program for outputting a desired error condition message upon the occurrence of a time pulse from a clock within the process control computer upon the determination that a monitored error condition has taken place;

FIG. 11 is a chart provided to illustrate for each defined functional unit the relationship between a given input event and associated input variables, response events and response variables for the example of FIG. 1; and, FIG. 12 is an illustration of a typical prior art process control computer programming structure to show the interrelationship between hardware and software portions thereof.

SYMBOLS USED IN DESCRIPTION

Figure 1:
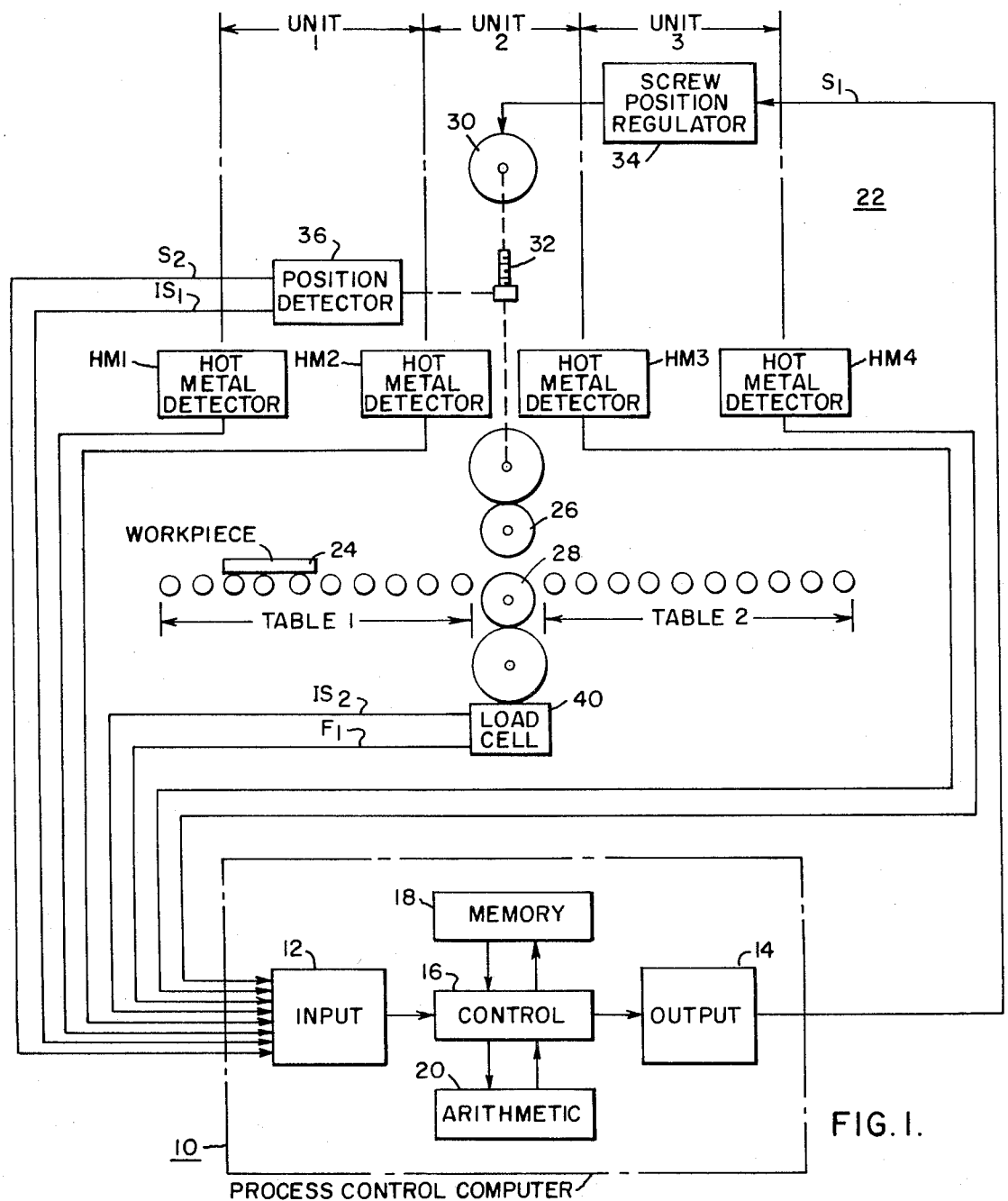
FIG. 1 is a schematic showing of a dynamic process example of a single stand rolling mill operative with a programmed digital process control computer suitable for operation in accordance with the teachings of the present invention.

H — response event identification number
I — input event identification number
N(I) — number of input variables associated with input event I
R(I) — number of response events for input event I IDV(I,J) — identification number of input variable J for input event I where J = 1 to N(I)
IDR(I,A) — identification number of response event A for input event I, [A = 1 to R(I)]
NOR(I,B) — number of response variables associated with response event B for input event I, [B = 1 to R(I)]
IDT(I,C,D) — identification number of associated response variable D for response event C for input event I
T — present time, [C = 1 to R(I)]; [D = 1 to NOR(I,B)]
N — current number of input variables to be processed (used as index counter)
R — current number of response events to be processed (used as index counter)
K — temporary storage for response event identification number
L — temporary storage for error bit number
M — temporary storage for response variable identification number
O — temporary storage for current number of response variables to be processed
X — temporary counter used in time delay program $T_{max}$ — computer maximum time response
$T_{min}$ — computed minimum time response
$A_{max}$ — computed maximum amplitude
$A_{min}$ — computed minimum amplitude
Y — total number of error message bits

GENERAL STORAGE TABLES FOR INPUT EVENT I

INPUT VARIABLE DATA
Table A(I,1) (for input event I, first table)
1) N(I) — number of input variables associated with input event I
2) IDV(I, 1) — identification number of 1st input variable for input event I
3) IDV(I,2) — identification number of 2nd input variable for input event I
1+N(I))
   IDV(I,N(I)) — identification number of N(I)th input variable for input event I
RESPONSE EVENT DATA
Table A(I,2)

1) R(I) — number of response events for input event I
2) IDR(I,1) — identification number of 1st response event for input event I
3) IDR(I,2) — identification number of 2nd response event for input event I
1+R(I))
   IDR(I,R(I)) — identification number of R(I)th response event for input event I
RESPONSE VARIABLE DATA
Table A(I,3)
1) NOR(I,1) — number of response variables associated with response event 1 for input event I
2) IDT(I,1,1) — identification number of 1st associated variable of 1st response event for input event I
3) IDT(I,1,2) — identification number of 2nd associated variable of 1st response event for input event I
1+NOR(I,1))
   IDT(I,1,NOR(I,1)) — identification number of NOR(I,1)th associated variable of 1st response event for input event I
Table (A(I,4)
1) NOR(I,2) — number of response variables associated with response event 2 for input event I
2) IDT(I, 2,1) — identification number of 1st associated variable of 2nd response event for input event I
1+NOR(I,2))
   IDT(I,2,NOR(I,2)) — identification number of NOR (I,2)th associated variable of end response event for input event I
Table A(I,R(I)+2)
1) NOR(I,R(I)) — number of response variables associated with response event R(I) for input event I
2) IDT(I,R(I),1) — identification number of 1st associated variable for response event R(I) for input event I
1+NOR(I,R(I)))
   IDT(I,R(I),NOR(I,R(I))) — identification number of NOR(I,R(I)th associated variable of R(I)th response event for input event I
for each input event I there are R(I)+2 distinct A Tables.

DEFINITION OF A FUNCTIONAL UNIT

A monitored process functional unit specifies a predictive relationship between a distinct input event, which occurs in the operation process along with the values of relevant measurable variables associated with this distinct input event and other subsequent and associated response events in the process operation and the values of measurable variables associated with these subsequent response events. An input event, in the example of FIG. 1, is the occurrence of an electrical signal at the interface between the control computer and its hardware data input devices, which cause the operation of an application software program specifically related to the unique nature of this electrical signal. When an input event occurs, then, the control computer has knowledge of the time of the occurrence of a distinctive hardware function related to that input event. For example, an input event is the triggering of a hardware interrupt caused by the passage of a hot metal workpiece under a hot metal detector.

The predictive relationship specifically applies to the established minimum and/or maximum time durations between the time of the input event and subsequent associated response events necessary for the assumption of proper hardware function for those hardware elements specifically involved in determining the operational relationship among these associated events. This predictive relationship also applies to the established maximum and/or minimum amplitudes of variables associated with these subsequent response events, and which are measured at the time of those subsequent response events, necessary for the assumption of proper functioning of the related hardware.

When a functional unit has been defined, then one input event only can occur at one time, and when the input event associated with this defined functional unit occurs, a prediction of maximum and/or minimum allowed times of occurrences of subsequent related response events could be made, and a prediction could be also made of the maximum and/or minimum allowed amplitudes or values of variables associated with these subsequent related response events. These predictions are made from mathematical relationship derived from observation and manual data as well as knowledge of mill system specification which enable the prediction to be made of the operation of hardware and software associated with a given functional unit. This hardware and software is assumed to have been designed to operate within predetermined design limits. The functional unit places error bounds on those aspects of operation which can be described in terms of input event and associated response events. These error bounds are related to acquired knowledge of these design limits. If the time of subsequent response events associated with an input event is outside the calculated time bound, an error condition is said to exist. If associated variables, such as roll force at next stand, position of workpiece, workpiece temperature and the like are outside the calculated amplitude bounds, an error condition is also said to exist.

A functional unit may be defined among any hardware and software elements where a predictive relationship can be defined and the input and response events, and associated variables necessary to determine proper hardware and software functioning with respect to response timing and association variable values, are available in a measurable form. For example, there are certain hardware elements in a rolling mill where functional units can be defined in a straight forward and predicable manner. The following are examples of simple hardware units vital to rolling mill control.

HARDWARE UNIT

| A. Position Regulators | Function | Design Response |
|---|---|---|
| 1. Screwdown regulator | move mill screwdown to assigned position | maximum and minimum time for screw movement; allowed positioning accuracy; Anticipate or zero error interrupt given when movement is complete |
| 2. Motor speed regulator | change motor speed to reference value | maximum and minimum time for change of motor speed; allowed speed accuracy; anticipate or zero error interrupt given when movement is complete |
| 3. Sideguide regulator | move sideguides to desired setting | maximum and minimum time for sideguide movement; allowed positioning accuracy; anticipate or zero error interrupt given |
| B. Pressductor Unit | Provides roll force and rolling time feedback | Pressductor ON interrupt given within maximum time of threshold force application; Pressductor OFF interrupt given within maximum time of threshold force release; force analog signal given to determined accuracy when force above threshold is applied |
| C. Metal detector | Provides position information of hot metal | Provides ON interrupt within maximum time of hot metal reaching detector; provides OFF interrupt within maximum time of hot metal leaving detector. |
| D. Pyrometer | Provides temperature information of hot metal | Provides analog signal within a maximum time of hot metal reaching pyrometer; provides analog temperature reading to determine accuracy |
| E. Data Input Devices which operate prior to rolling | | |
| 1. card-reader; tape reader; keyboard device | transfers predetermined rolling information to and from computer | provides data at defined times; produces data in predetermined format with predetermined limits |
| 2. data link | transfers rolling information to and from another computer or device | provides data at defined times; provides data in predetermined format with predetermined limits |

Functional units can be defined from these devices or a combination of these devices and predictive equations can be written to determine maximum and minimum bounds in response event timing and associated variable values, The exact nature of these equations would depend greatly upon the particular control application and the degree of error control being sought. The following examples illustrate some functional units which would ordinarily be used:

| Unit | Input Event | Input Variables | Response Events | Response Variables | Error Checks (1) T min and T max; (2) A min and A max |
|---|---|---|---|---|---|
| screwdown regulator | positioning command | (1.) present screw position; (2.) new screw position | zero error or could be anticipate interrupt to indicate zero error in 1 sec. | screw position (meas. to see how close to ref) | (1) time of interrupt; (2) screw position accuracy |
| Speed regulator | positioning command | present speed; new speed | zero error or anticipate interrupt | motor speed | (1) time of interrupt; (2) speed accuracy |

| Unit | Input Event | Input Variables | Response Events | Response Variables | Error Checks (1) T min and T max; (2) A min and A max |
|---|---|---|---|---|---|
| sideguide regulator | positioning command | present position; new position | zero error or anticipate interrupt | sideguide position | (1) time of interrupt; (2) position accuracy |
| hot metal detector A and subsequent hot metal detector B on same tables | hot metal detector A ON or OFF interrupt | table speeds between A and B | hot metal detector B ON or OFF interrupt | none | (1) time of hot metal detector B interrupt ON or OFF |
| pressductor A and subsequent pressductor B on same mill | pressductor A ON or OFF interrupt | mill roll speeds between A and B | pressductor B ON or OFF interrupt | none | (1) time of pressductor B interrupt ON or OFF |

GENERAL OPERATION OF ERROR MONITOR

For each input event signal, one or more associated response event signals are monitored. These response event signals can be described in terms of at least established maximum and/or minimum limits relative to time and perhaps amplitude. The error monitor program includes equations for predicting, for each response event signal, at least one of $T_{max}$ and $T_{min}$ limits of time and $A_{max}$ and $A_{min}$ limits of amplitude. This can be done by looking at the process operational specifications and determining that each identified response event should have occurred within an established time interval defined by $T_{max}$ and $T_{min}$, and if it does not then provide an error output alarm. Or this can be done by observation of process manual operation, to establish for example, the velocity of metal passing a given location at a given time and so forth, taking readings when input events to functional units of interest happen, and then utilize that operation as a model for comparison. From this, maximum and minimum time and amplitude error limits can be established, and the error monitor can check to see that these error limits are not exceeded. Where the automatic operation is substantially different from the manual or desired reference operation, proper adjustments of the process operation can be made.

All of the monitored error conditions are established from the time and amplitude response of the desired operation of each functional unit, and the intended operation of the error monitor rests on this premise. Relative to the making of a desired time check, at a certain time, $T_0$, the error monitor detects an input event signal for a given functional unit, and the response event characteristic dictates that the response event signal to this input event signal should be received by a maximum time $T_0$ plus $\Delta T$, and if the response event signal has occurred within the latter time, this indicates proper time sequence operation of the process, provided the $T_{min}$ limit is also satisfied. At input event signal occurrence time $T_0$ the error monitor sends for the $T_{max}$ error check a request for an error message at time ($T_0$ plus $\Delta T$), stating that the desired response event signal has not occurred. If the response event signal occurs in this time, the request for this error message is cancelled. If the response event signal does not occur in this time ($T_0$ plus $\Delta T$), then the operator is informed of the related error condition.

Relative to the making of an amplitude check for response event variable signals, the error monitor can additionally check the amplitude of the response event signal at the time of the response event against allowable limits. If the response event variable signal is not within these desired amplitude limits, an immediate request is made for an error message stating that there has been an amplitude limit error. This procedure is generally followed in relation to all established functional units having defined error bounds for response event variable signals relative to the mill operation.

A check could also be made for the minimum time error, when the response event signal has occurred. The failure of the hardware response event not occurring at all is more related to the making of a maximum time check, but the more general concept would include a check of the minimum time here, since problems might be present regarding mill noise or mill chatter. For example, when the hot metal detector ON input signal occurs, the error monitor program can be established such that the pressductor ON signal should not occur before a certain minimum time interval, since it is known physically that the workpiece cannot reach the pressductor in less than a defined time period. So the minimum time delay check would be a check against noise, and the maxium time delay check would be a check against some failure in the system. For another example, an input event signal for a screwdown position regulator can be detected at time $T_0$ to position the regulator to 500 mils $\pm$ 10 mils, and an associated bid request for an error message "screwdown position regulator XX failure," (where XX could relate to one of roll stand regulators 1, 2, 3) is made for $T_0$ plus $\Delta T_1$ sec, where $T_1$ is the maximum allowed time interval. If the zero error response event signal is received at time $T_1 < T_0 + \Delta T_1$ seconds, the request or bid for this error message is cancelled. The screwdown position is read at this time, and if it is 570 mils, an error message "SCREWDOWN POSITION REGULATOR XX POSITION MALFUNCTION" can be printed; on the other hand if it is 505 mils, no error message would be printed. If the zero error response event signal is not received before $T_0 + \Delta T_1$ seconds, the requested or bid for error message is printed. It can be seen that there is here made a comparison of the response against certain predetermined time and/or amplitude limits. For each response event there is established in advance through the use of predictive equations the desired time and/or amplitude limits.

In general the error monitor program places strict bounds or limits on the time and/or amplitude characteristics of all defined functional units in the process operation. If these bounds are exceeded, the human interface is informed of the existence of an error in the actual operation in relation to a predetermined desired operation and software recovery of the process operation from such error can be started if desired. For instance, a slab can be predicted to be at a certain metal detector HM1 at time $T_0$, and produce an interrupt at time $T_0 + \Delta T_6$, where $\Delta T_6$ is an arbitrary time interval constant. This prediction was made when it passed another metal detector at previous time $T_0 - \Delta T$. At time $T_0 - \Delta T$ the request was made for the metal detector failure message at time $T_0 + \Delta T_6$. In this case the response event for metal detector HM1 ON was made at time $T_0 - \Delta T$. This in effect provides a prediction for this particular event in a given functional unit to happen. For another example, if a workpiece is moving down a process line toward three hot metal detectors, when the first hot metal detector ON signal occurs, a prediction can be made regarding when the second hot metal detector ON signal will occur and when the third such ON signal will occur. When running a high duty cycle on the control computer, there may not be time to do all this before the workpiece gets to the second hot metal detector, so in that case an effort is made to anticipate certain error conditions and calculate them at this time.

With knowledge of the arrival time of metal in a given mill stand, it is possible to predict the occurrence of related response events in a certain sequence and in established maximum time intervals. Consider the ordered set of selected events [E1, E2, on through EN], which occur to metal being rolled, and assume that it is feasible to predict the maximum times between each such ordered event, $[T_1, T_2, \ldots T_{N-1}]$, which latter time is the time between EN−1 and EN. There can then be established the existence of a functional unit between neighboring members of the ordered event set. Each such functional unit can be represented and checked by the error monitor in accordance with the above principles of the present invention.

DESCRIPTION OF A PREFERRED EMBODIMENT

The operation of a simplified process, such as a single stand rolling mill shown in FIG. 1 and including a run in table TABLE 1, a run out table TABLE 2, a mill stand including back-up rolls and work rolls 26 and 28, a plurality of hot metal detectors HM1, HM2, HM3 and HM4, a load cell 40 operative with the stand for sensing the roll separation force between the work rolls, a screw position detector 36 and a position regulator 34 for determining the opening or roll gap between the work rolls. A workpiece such as a hot slab 24 enters the process and the first hot metal detector HM1 gives an interrupt ON signal to indicate the start of the process as shown in FIG. 1 and that the workpiece 24 has entered the run in tables TABLE 1. When the workpiece reaches the hot metal detector HM2, a position command signal and a position reference signal $S_1$ are sent to the screwdown position regulator 34 such that the position regulator moves the screwdown motor 30 and the cooperative screw mechanism 32 to cause the work rolls 26 and 28 to achieve an unloaded roll opening position in accordance with the desired reference position. The position detector 36 generates a zero-error interrupt signal $IS_1$ when the desired roll position is reached and continuously generates an actual screw position signal S2 in accordance with the actual position of the screwdown apparatus. When the workpiece 24 enters the mill rolls of the mill stand the load cell 40 generates an interrupt signal $IS_2$, when the roll force rises above the threshold level, and the load cell thereafter continuously supplies the analog roll force signal $F_1$. When the workpiece 24 has passed through the rolls 26 and 28 of the mill stand, the workpiece 24 exits from the mill stand onto the run off tables TABLE 2 where the position of the workpiece 24 is sensed by the hot metal detector HM3 as the workpiece enters the run off table TABLE 2. The position of the workpiece is sent by the hot metal detector HM4 when the workpiece exits from the run off table TABLE 2.

The apparatus so far described can be divided into three functional units relative to the involved hardware as shown in FIG. 1.

Functional unit 1 includes the run in tables TABLE 1, the hot metal detector HM1 and the hot metal detector HM2. The input event associated with this functional unit 1 would be the hot metal detector HM1 on interrupt signal. The input variables would be none. It might be possible to operate the apparatus such that the hot metal detector HM1 ON interrupt signal would be operative to initiate a control of the operating speed of the run in table TABLE 1, such that an input variable could be the motor speed of the run in table TABLE 1. On the other hand if it is assumed that the run in table TABLE 1 is operating at desired reference speed, this input variable is not required. A response event for this unit 1 would be the ON interrupt signal from the hot metal detector HM2 to indicate that the workpiece had completed its travel between the hot metal detector HM1 and the hot metal detector HM2. A response variable for this unit 1 is none.

Functional unit 2 would include the hot metal detector HM2, the mill stand, the load cell 40 operative with the mill stand, the screw position detector 36 operative with the mill stand and the hot metal detector HM3. The input event would be the hot metal detector HM2 on interrupt signal. The input variables would be the screw position reference signal $S_1$ at the time the hot metal detector HM2 on interrupt signal is provided, and the actual feedback position signal $S_2$ from the position detector 36 at the time the hot metal detector HM2 ON interrupt occurred. The response events for this unit 2 would be the interrupt signal $IS_2$ from the load cell 40 and the interrupt signal $IS_1$ from the position detector 36 to indicate a zero-error condition, and the hot metal detector HM3 ON interrupt signal to indicate the head end of the workpiece had passed under the position of the hot metal detector HM3. The response variable would be the force feedback signal $F_1$ from the load cell 40 when the interrupt signal $IS_2$ occurs, and the feedback signal $S_2$ from the position detector when the screw zero error interrupt signal $IS_1$ from the position detector occurs. The response variable corresponding to the hot metal detector HM3 ON interrupt signal would be none.

Relative to functional unit 3, this would include the run out tables TABLE 2, the hot metal detector HM3 and the hot metal detector HM4. The input event would be the hot metal detector HM3 on interrupt signal. The input variables would be none. The responsive event would be the hot metal detector HM4 ON interrupt signal. The response variables for unit 3 would be none.

It should be understood that the analog force reading signal $F_1$ from the load cell 40 is provided upon a threshold roll force in the order of ½ million pounds being realized. The signal $IS_2$ is the load cell threshold ON interrupt signal. The signal $S_1$ to the screw position regulator is the desired screw position reference from the central processing unit 10. The signal S2 from the screw position detector 36 is the actual screw position reading in accordance with the actual unloaded roll opening between the work rolls 26 and 28. The signal IS1 from the screw position detector is the screw position zero-error ON interrupt signal.

For the case of the functional unit 1 above set forth, it is necessary to establish only the maximum and minimum time checks and these are determined by the following functional unit equations.

Maximum time check $$T_{max} = [F_1] * [T/A]$$

where $F_1$ is an empirically established function operator matrix, which function operator matrix establishes an arbitrary function with input variables $T$ over $A$, and $T$ is the present time of day and the quantity $A$ is an array of input variables in a one row and one column matrix. This can be resolved by persons skilled in this art to $$T_{max} = T + \Delta D1$$

where $T_{max}$ is the maximum time for the response event HM2 ON interrupt signal to occur. $T$ is the present time of the occurrence of the HM1 ON interrupt signal, and the quantity $\Delta D1$ is the pre-established error constant for the maximum time which is arbitrarily established by observation of operation of the process, for example a maximum time constant of 2 minutes.

The minimum time check is established by the following functional unit equation
Minimum time check $$T_{min} = [F_2] * [T/A]$$

which for this example can be resolved to $$T_{min} = T + \Delta D2$$

where $T_{min}$ is the minimum time for the HM2 ON interrupt signal to occur and $\Delta D2$ is the pre-established error constant for this minimum time interval, for example 1 minute. It will be seen that the above two functional unit equations thereby establish the minimum and maximum time boundaries for the responsive HM2 ON interrupt signal to occur subsequent to the HM1 ON interrupt input event.

The functional unit 3 is generally the same as the functional unit 1 in regard to the determination of a maximum and a minimum time check. The equation for determining the maximum time check for functional unit 3 is $$T_{max} = T + \Delta D3$$

where $T_{max}$ is a maximum time for the HM4 ON interrupt signal to occur in response to the HM3 ON interrupt signal, and $T$ is the present time of occurrence of the HM3 ON interrupt signal.

The minimum time check for the functional unit 3 is established by the formula $$T_{min} = T + \Delta D4$$

where $T_{min}$ is the minimum time for the HM4 ON interrupt signal to occur in response and subsequent to the HM3 ON interrupt signal, and $\Delta D4$ is the pre-established error constant for the minimum time interval for the occurrence of the HM4 ON interrupt signal in response to the earlier happening of the HM3 ON interrupt signal when the workpiece movement between HM3 and HM4 is in accordance with the generally established and desired normal operation of the rolling mill.

The functional unit 2 requires the determination of maximum and minimum time checks as well as maximum and minimum amplitude checks for the process operation. The maximum time check for each of the three response events is determined by the formula relationships.

$$T_{max_1} = T + \Delta D5$$
$$T_{max_2} = T + |S_1 - S_2| \Delta D6$$
$$T_{max_3} = T + \Delta D7$$

where $T_{max_1}$ is the maximum time to receive the force interrupt signal IS2, $T$ is the present time of occurrence of the HM2 ON interrupt signal and $\Delta D5$ is the pre-established maximum time interval error constant for the IS$_2$ ON interrupt signal response event. $T_{max_2}$ is the maximum time to receive the screw zero error interrupt signal IS$_1$, S$_1$ is the actual screw position at the time of the HM2 ON interrupt signal, S$_2$ is the screw position reference provided at the time of the HM2 ON interrupt signal and $\Delta D6$ is the pre-established maximum positioning time interval error constant. $T_{max_3}$ is the maximum time to receive the HM3 ON interrupt signal after the occurrence of the HM2 ON interrupt input event signal and $\Delta D7$ is the pre-established maximum time interval error constant for the occurrence of the HM3 ON interrupt signal.

The minimum time check equations are generally in accordance with the maximum time check equations and can be written out as follows:

$$T_{min_1} = T + \Delta D8$$
$$T_{min_2} = T + |S_1 - S_2| \Delta D9$$
$$T_{min_3} = T + \Delta D10$$

where $T_{min_1}$ equals the minimum time for the IS$_2$ ON interrupt signal to occur. $T$ equals the present time of the HM2 ON interrupt signal and $\Delta D8$ is the pre-established minimum time interval error constant for the occurrence of the IS$_2$ ON interrupt signal. $T_{min_2}$ equals the minimum time to receive the screw position zero error interrupt signal IS$_1$. S$_2$ is the actual screw position at the time of occurrence of the HM2 ON interrupt signal. S$_1$ is the screw position reference given at the time of the HM2 ON interrupt signal, and $\Delta D9$ is the pre-established minimum positioning time interval error constant. $T_{min_3}$ equals the minimum time to receive the HM3 ON interrupt signal, and $\Delta D10$ is the pre-established minimum time interval error constant for the occurrence of the HM3 ON interrupt signal.

The maximum amplitude check for the functional unit 2 is determined by the formula relationship $$F_{1max} = \Delta D11$$
$$S_{2max} = S_1 + \Delta D12$$

where $F_{1max}$ is the maximum force amplitude and $S_{2max}$ is the maximum position amplitude. $F_{max}$ is the maximum force reading at the occurrence of the IS$_2$ ON interrupt signal and $\Delta D11$ is the pre-established maximum allowed amplitude of the force signal $F_1$. $S_{2max}$ is the maximum screw position of the occurrence of the IS$_1$ ON the interrupt signal, S$_1$ is the screw position reference given at the occurrence of the HM2 ON interrupt signal and $\Delta D12$ is the pre-established maximum upper error limit on the screw position at the occurrence of the HM2 ON the interrupt signal.

The minimum amplitude check for the functional unit 3 is determined by the formula equations.

$$F_{1min} = \Delta D13$$
$$S_{2min} = S_1 - \Delta D14$$

$F_{1min}$ is the minimum force reading at the time of the IS$_2$ ON interrupt signal, and $\Delta D13$ is the pre-established minimum allowed value of the analog force reading signal $F_1$. $S_{2min}$ is the minimum screw position at the time of the occurrence of the IS$_1$ ON interrupt signal, S$_1$ is the screw position reference sent at the time of the HM2 ON interrupt signal and $\Delta D14$ is a pre-established maximum lower deviation of the screw position.

Thusly it can be seen that the actual screw position should be the desired reference position S$_1$ plus or minus an upper and a lower error tolerance. Also it should be noted that model equations may be utilized to predict the reference roll force for the stand operation, and for the case of a tandem rolling mill schedule calculations for the workpiece passing through each of the stands or for a reversing mill the calculated force schedule for each pass of the workpiece through the same stand.

It should be noted that the above function operator matrix notation is a well known formalized way of expressing the evaluation of an arbitrary function whose independent variables are stored in $T$ and $A$ matrices. In the case of a linear relationship, the function operator matrix would reduce to multiplying factors. It is a formalized way of evaluating the predictive relationships involved, and it should be noted that in actual practice, the predictive equations may be stored in a different manner such as the here illustrated resolved equations. The operation of the error monitor here disclosed does not depend upon the utilization of such function operators, but instead the predictive equations may be stored in any suitable manner, such as adding to the present time $T$ a pre-established desired time error constant interval for the next sequential event to occur, and some established amplitude range stored as an error constant.

FIG. 2 EXAMPLE

Figure 2:
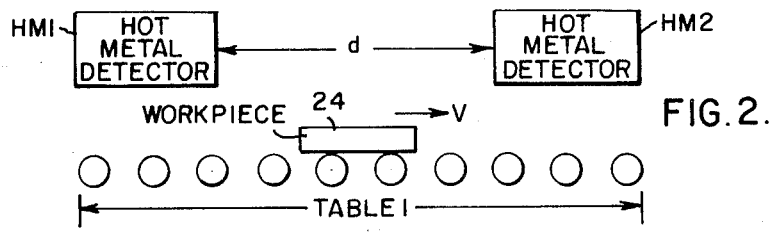
FIG. 2 illustrates a more simple example of a given functional unit including a workpiece moving along a roller table between two hot metal detector devices.

In FIG. 2 there is shown an example of an illustrative "Functional Unit," where

V is the velocity of workpiece 24 as it passes metal detector HM2
HM1 is hot metal detector 1
HM2 is hot metal detector 2
$d$ is the distance betweem HM1 and HM2
TABLE 1 is a table drive
V' is the tangential velocity of the table rolls.

The input event is HM1 ON signal which occurs upon HM1 detecting the passage of hot metal 24 on table TABLE 1. There is a response event which is the HM2 ON signal, upon HM2 detecting the passage of hot metal 24. The tangential velocity V' of table TABLE 1 is a response variable of workpiece 24 as it passes HM2. Assume there is a device at HM2 to measure the metal velocity V, when the HM2 ON signal response event occurs.

This typical functional unit can be expressed in the form:

$[T_{max}] = [f_1] * [T/A]$ $[T_{max}]$ is a $1 \times 1$ matrix of maximum time for HM2 ON to occur
$[f_1]$ is a $1 \times 1$ function matrix for calculation of $[T_{max}]$
$[T]$ is a $1 \times 1$ matrix for time of HM1 ON event
$[A]$ is a $1 \times 1$ matrix for measured value of V' at HM1 ON event or $T_{max} = T + (EC1) d/V'$, where $EC1$ is an error constant $> 1$ $EC1$ is large enough so that if response event HM2 ON signal has not occurred by $T_{max}$, it can be reasonably assumed that hardware failure such as workpiece 24 falling off the table TABLE 1 has occurred.

$[T_{min}] = [f_2] * [T/A]$ $[T_{min}]$ is a $1 \times 1$ matrix of minimum time for HM2 ON signal to occur
$[f_2]$ is a $1 \times 1$ function matrix for calculation of $[T_{min}]$ or reducing the above equation to $T_{min} = T + (EC2) d/V'$, where $EC2$ is an error constant $< 1$ The error constant $EC2$ is small enough so that it can be assumed that workpiece 24 cannot reach HM2 before the time $T_{min}$. If HM2 ON signal occurs before time $T_{min}$ it can then be assumed that HM2 ON signal response event was due to noise or extraneous signal inputs.

$[A_{max}] = [f_3] * [T/Z]$ $[A_{max}]$ is a $1 \times 1$ matrix of maximum metal velocity at HM2 on
$[f_3]$ is a $1 \times 1$ function matrix for calculation of $[A_{max}]$ reducing the above equation gives $A_{max} = (EC3)V'$, where $EC3 > 1$ If measured velocity of workpiece S at time of HM2 On signal is greater than $A_{max}$ it is assumed that either readings of $V$ or $V'$ are at fault or workpiece 24 is entering table drives TABLE 1 at a higher than expected velocity.

$[A_{min}] = [f_4] * [T/A]$ $[A_{min}]$ is a $1 \times 1$ matrix of metal velocity at HM2 ON
$[f_r]$ is a $1 \times 1$ function matrix for calculation of $[A_{min}]$ This can be reduced to $A_{min} = 0 \cdot T + (EC4)V'$, where $EC4$ is an error constant $> 1$ If measured velocity at HM2 ON signal is less than $A_{min}$ it can be assumed that excessive slippage is occurring on the table drives TABLE 1 or readings of $V$ or $V'$ are at fault.

Information storage tables are provided to indicate a reflection of the process operation. For the illustrated example shown in FIG. 1 of a single stand rolling mill having a total of three input events or the specified three functional units, identification numbers 1, 2 and 3 are respectively provided for these three input events as follows:

COMPOSITION OF STORAGE TABLES

There are a total of three input events whose I.D. numbers are 1, 2, 3 respectively
$I = 1$. HM1 ON
$I = 2$. HM2 ON
$I = 3$. HM3 ON A. Storage Table For Input Event or Functional Unit 1

Table A(1,1) (input variables)
   0 — no input variables associated with event 1
Table A(1,2) (response events)
   1 — HM2 ON response event
   4,1,1 — I.D. number for response event HM2 ON 0
   For this example the I.D. response number is broken into three number fields.
   1. 4 — the I.D. number for HM2 ON response event
   2. 1 — the maximum time check request (1=yes, 0=no)
   3. 1 — the minimum time check request
Table A(1,3) (response variables)
   0 — no response variables for HM2 ON response event Storage Table For Input Event or Functional Unit 2

Table A(2,1) (input variables)
   2 — two input variables, screw position $S_2$ and screw reference $S_1$ S1VAR — symbolic designation for screw reference $S_1$ S2VAR — symbolic designation for screw position $S_2$ TABLE A (2,2) (response events)
3 — three response events IS2 ON, IS1 ON and HM3 ON
5,1,1 — pressductor ON
6,1,1 — screw position zero-error
7,7,1 — HM3 ON Table A(2,3) (response variables)
1 — Force $F_1$ associated with IS2 ON
F1VAR,1,1— response variable I.D. number for force For this example, the I.D. number is broken into three number fields
1. F1VAR — response variable I.D. number
2. 1 — the maximum amplitude check request
3. 1 — the minimum amplitude check request.

Table A(2,4)
1 — screw reading $S_2$ associated with $IS_1$ ON
S2VAR,1,1 — response variable I.D. for screw reading $S_2$ Table A(2,5)
0 — no variables associated with HM3 ON Storage Table For Input Event 3

Table A(3,1)
0 — no input variables for input event 3

Table A(3,2)
1 — HM4 ON response event
8,1,1 — I.D. for response event HM4 ON

Table A(3,3)
0 — no response variables

B. Storage Table For Error Bits

TABLE B1 (time errors)

| Response Event I.D. | Error Bit No. For Min. Time Error | Error Bit No. For Max. Time Error |
|---|---|---|
| 4,1,1 | 1 | 6 |
| 5,1,1 | 2 | 7 |
| 6,1,1 | 3 | 8 |
| 7,1,1 | 4 | 9 |
| 8,1,1 | 5 | 10 |

TABLE B2 (amplitude errors)

| Variable I.D. | Bit No. For Min. Value Error | Bit No. For Max. Value Error |
|---|---|---|
| S2VAR,1,1 | 12 | 16 |
| F1VAR,1,1 | 13 | 17 |

C. Storage Table For Minimum Time Response Values

| Response Event I.D. | Calculated $T_{min}$ |
|---|---|
| 4,1,1 | $T_{min}$ |
| 5,1,1 | $T_{min}$ |
| 6,1,1 | $T_{min}$ |
| 7,1,1 | $T_{min}$ |
| 8,1,1 | $T_{min}$ | values calculated by predictive equation
Tables C,D,E & F contain values for response events and variables for which the response event has not yet occurred and the maximum time has not elapsed

D. Storage Table For Maximum Amplitude Values of Response Variables

| Response Event I.D. | Associated Variable I.D. | Calculated $A_{max}$ Value |
|---|---|---|
| 5,1,1 | F1Var,1,1 | $A_{max_5}$ calculated |
| 6,1,1 | S2VAR,1,1 | $A_{max_6}$ values |

E. Storage Table For Minimum Amplitude Values of Response Variables

| Response Event I.D. | Associated Variable I.D. | Calculated $A_{min}$ Value |
|---|---|---|
| 5,1,1 | F1VAR,1, | $A_{min_5}$ calculated |
| 6,1,1 | S2VAR,1,1 | $A_{min_6}$ values |

F. Time Delay Table

| Bit No. For Max. Time Error | Response Event I.D. No. | $T_{max}$ Values |
|---|---|---|
| 6 | 4,1,1 | $T_{max_6}$ (calculated values) |
| 7 | 5,1,1 | $T_{max_7}$ |
| 8 | 6,1,1 | $T_{max_8}$ |
| 9 | 7,1,1 | $T_{max_9}$ |
| 10 | 8,1,1 | $T_{max_{10}}$ |

STORED ERROR MESSAGES ON MASS MEMORY

| Bit No. | Possible Error Message |
|---|---|
| 1 | Min. Time error for HM2 ON |
| 2 | Min. Time error for Load Cell interrupt $IS_2$ |
| 3 | Min. Time error for screw zero error $IS_1$ |
| 4 | Min. Time error for HM3 ON |
| 5 | Min. Time error for HM4 ON |
| 6 | Max. Time error for HM2 ON |
| 7 | Max. Time error for Load Cell interrupt $IS_2$ |
| 8 | Max. Time error for screw zero error $IS_1$ |
| 9 | Max. Time error for HM3 ON |
| 10 | Max. Time error for HM4 ON |
| 11 | (not used for this example) |
| 12 | Screw Position $S_2$ Below reference |
| 13 | Force Reading F1 Below limits |
| 14 | (not used) |
| 15 | (not used) |
| 16 | Screw Position $S_2$ Above Reference |
| 17 | Force Reading F1 Above Limits |

Relative to the above tables for input event 1 of functional unit 1, it can be seen that there are no input variables shown in the storage table A(1,1), which is one of the permanent storage tables for input event 1. In other words, no input variables are assocated with input event 1. The response events storage table A(1,2) for input event 1 would contain 1 in its first location to show the number of response events is one. This is the HM2 ON response event, which has stored in core memory the identification member 4,1,1 for response event HM2 ON interrupt, which is arbitrarily chosen and designates which $T_{max}$ and $T_{min}$ checks are to be made as folows:

For the example of the response I.D. number 4,1,1, broken into three number fields, 4 is the I.D. number for the HM2 ON response event, the first 1 is the maximum time check request. The second 1 is the minimum time check request. For the response variables storage tables A(1,3), there is shown as zero in the first location showing that for the first input event 1 there are no response variables for the HM2 ON response event.

The storage tables for the second input event 2 of functional unit 2 would be as follows for the input variables, in the first location of the table A(2,1) the 2 indicates the number of input variables, which are the screw position $S_2$ and a screw reference $S_1$. S1VAR is a symbolic designation for the screw reference $S_1$ to indicate the address location for this input variable. This is the address to locate it in the memory core. S2VAR is a symbolic designation for the screw position $S_2$.

Relative to the response events for input event 2, the storage table A(2,2) would include the number 3 in its first location to indicate three response events $IS_2$ ON, IS, ON and HM3 ON. The first response event identification number would be 5,1,1, to indicate the load cell on interrupt signal $IS_2$ showing that a $T_{max}$ and a $T_{min}$ check must be made. The second response event identification number would be 6,1,1 for the zero error position ON interrupt signal IS, showing that $T_{max}$ and $T_{min}$ checks are to be made. The third response event identification number would be 7,1,1, to indicate that the hot metal detector HM3 ON interrupt signal requires that $T_{max}$ and $T_{min}$ checks be made.

Relative to the response variables for the second input event 2 storage table A(2,3) for the force signal $F_1$, the number 1 in first storage location would indicate there is one variable associated with the response event interrupt signal $IS_2$, and this variable has a symbolic designation F1VAR,1,1 which is the address identification number for the storage location of the force reading $F_1$, and indicates that an $A_{max}$ and $A_{min}$ check are to be made.

The storage table A(2,4) for the screw position $S_2$ signal at the time of the zero error on interrupt signal $IS_1$, the number 1 in first storage location would indicate one variable, namely the screw reading $S_2$, associated with the $IS_2$ ON interrupt signal, and this variable has the address symbolic designation S2VAR,1,1 which is the address identification number for the actual screw position feedback signal which is read upon the occurrence of screw position zero error and indicates that an $A_{max}$ and $A_{min}$ check are to be made.

Storage table A(2,5) corresponding to the hot metal detector HM3 ON interrupt signal, the number 0 indicates there are no response variables associated with the HM3 ON interrupt signal.

Storage table B contains the total number of error bits corresponding to the maximum and minimum time and amplitude errors for the response events and the response variables. Table B1 contains three columns in this example, each column containing five numbers. The first column includes the response event I.D. numbers. The second column includes the bit numbers for the minimum time errors for the response events. The third column contains the bit numbers for the maximum time errors for the response events. The first column of table B2 contains the variable identification numbers. The second column contains the bit numbers corresponding to the minimum amplitude errors for the response variables. The third column contains the bit numbers for the maximum amplitude errors. Each column has two elements in this example corresponding to the screw position reading and the force reading.

Storage table C is the table for the minimum time response values. It has two columns the response event identification numbers and the calculated minimum time values which has been calculated by the predetermined equations. Tables C, D, E and F contain temporary data and may contain a variable number of storage elements. In this example for table C we have a maximum storage for five elements corresponding to five response events.

Storage table D contains the storage for the minimum amplitude values for the response variables. These minimum values are calculated at the time for the associated input event. The storage table is broken up into three columns. The first column being the I.D. number for the response event, the second column being the I.D. number for the associated variable, and the third column being the calculated minimum value for this variable. Storage table D in this example has a maximum of two elements corresponding to screw position and force feedback reading.

Storage table E contains the temporary storage for the minimum values of the response variables. This table is also borken into three columns. The first column is the response event I.D. number, the second column is the I.D. number of the associated variable, and the third column is the calculated minimum amplitude values for the associated variables. Storage table E contains two elements corresponding to the screw position and force feedback reading.

Table F, the time delay table, contains three columns. The first column contains the bit error number for the maximum time error for a functional unit which has had an input event and which has not had a corresponding response event and for which the maximum time has not expired. The second column contains the response event I.D. number for the response event. The third column contains the calculated maximum time values for these response events which were calculated at the time of the corresponding input event. In this example, table F shows a maximum of five elements corresponding to the five possible response events. Following this is shown a list of all the possible error messages stored on mass memory. The first column is the bit number or the unique error message identification number, and the second column is the error message stored on mass memory corresponding to this bit identification number.

EXPLANATION OF ERROR MONITOR PROGRAM

The error monitor program is divided into four distinct subprograms:

1. An input event program which runs in response to the occurrence of an input event (FIGS. 3, 4, and 5) as a subroutine from application program;
2. A response event which runs in response to the occurrence of a response event (FIGS. 6 and 7) as a subroutine from application program;
3. A time delay program which runs asynchronously with subprograms 1 and 2 as determined periodically by a time clock within the computer (FIG. 8); and
4. An error message output program which runs asynchronously with subprograms 1 and 2 as determined by a time clock periodically (FIG. 9).

Figure 3:
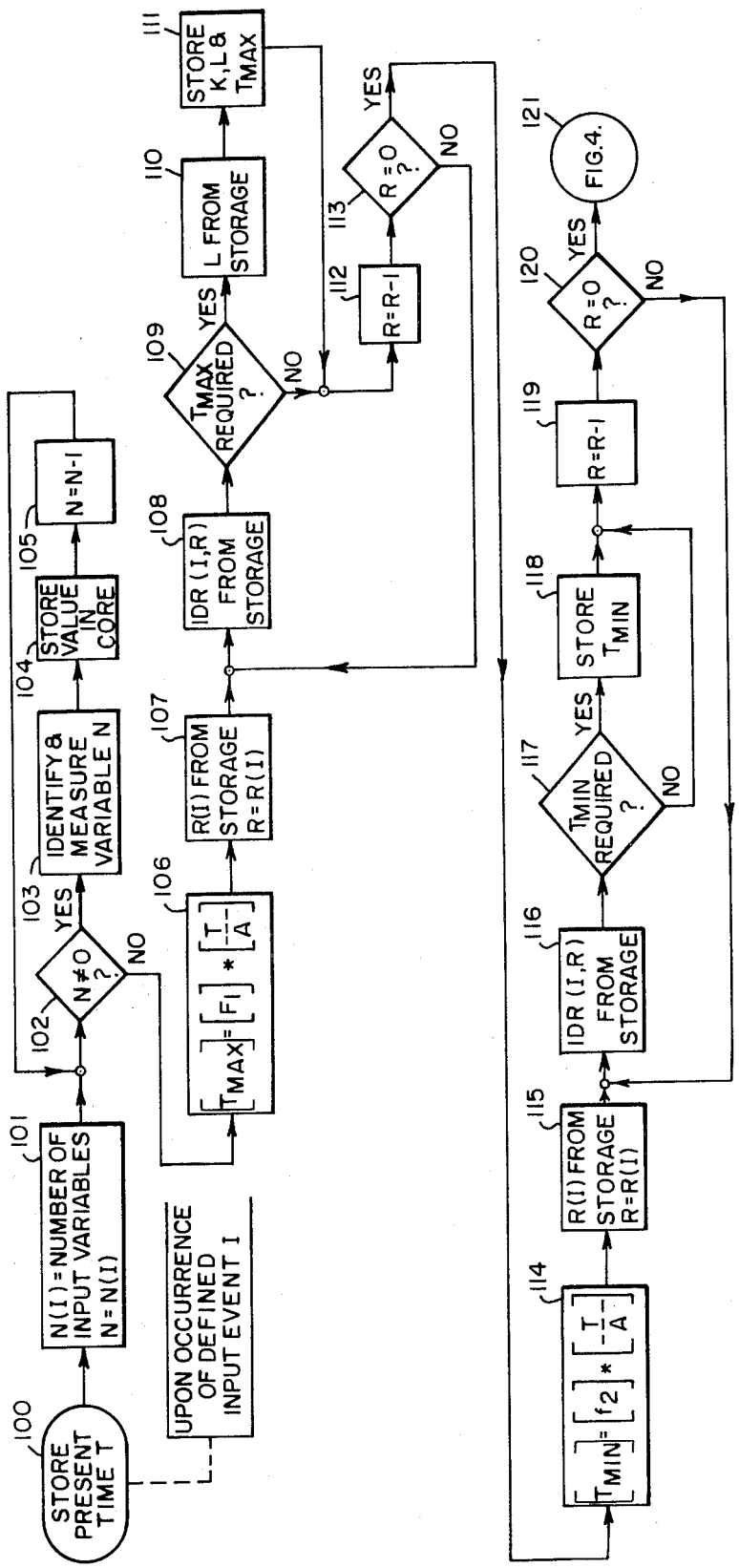
FIG. 3 illustrates a suitable input event logic flow chart program for operation with the process control computer shown in FIG. 1, to effect a predetermined check for a maximum time $T_{max}$ and a minimum time $T_{min}$ relative to all the response events associated with a given input event I.
Figure 4:
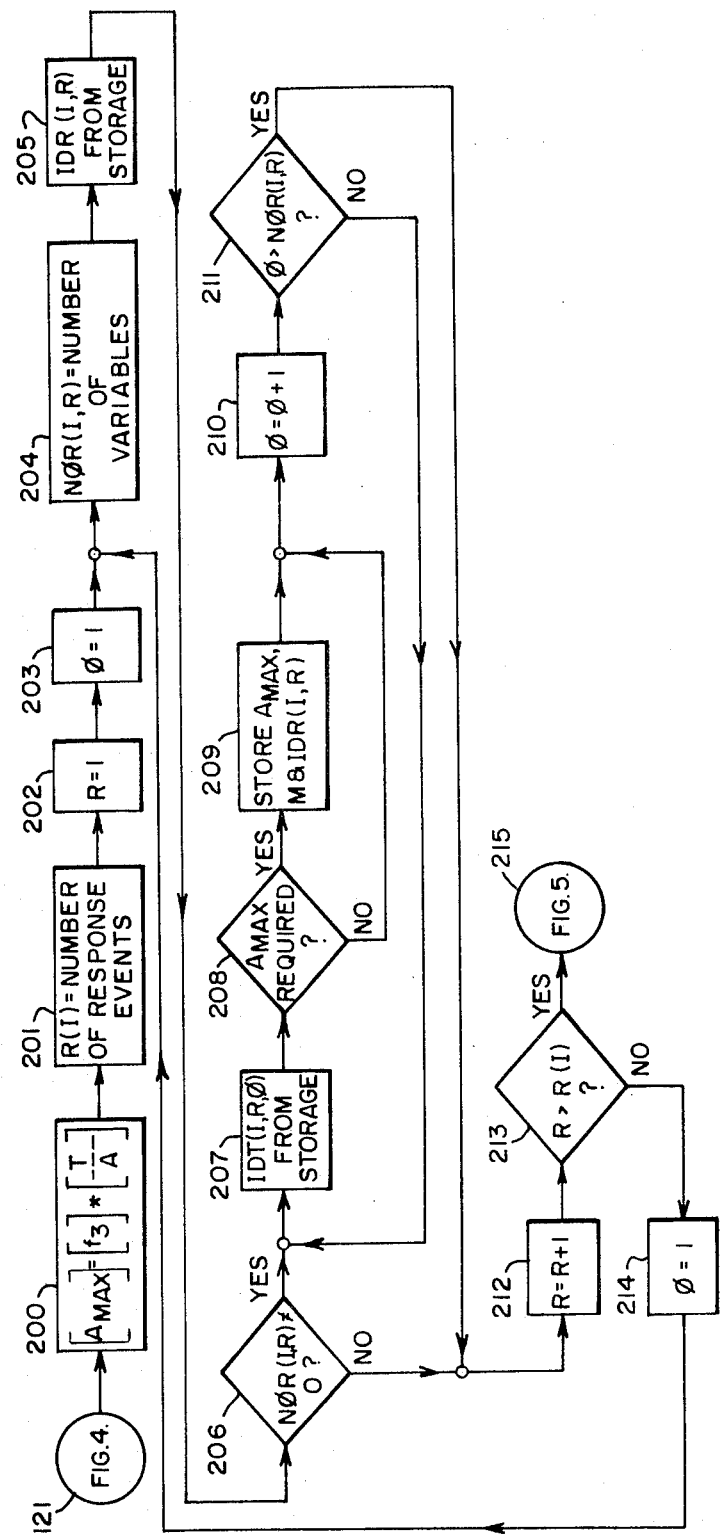
FIG. 4 illustrates a suitable logic flow chart program operative with the program of FIG. 3 for effecting a predetermined check for the maximum amplitude $A_{max}$ relative to all response variables associated with the response events of a given input event I.
Figure 5:
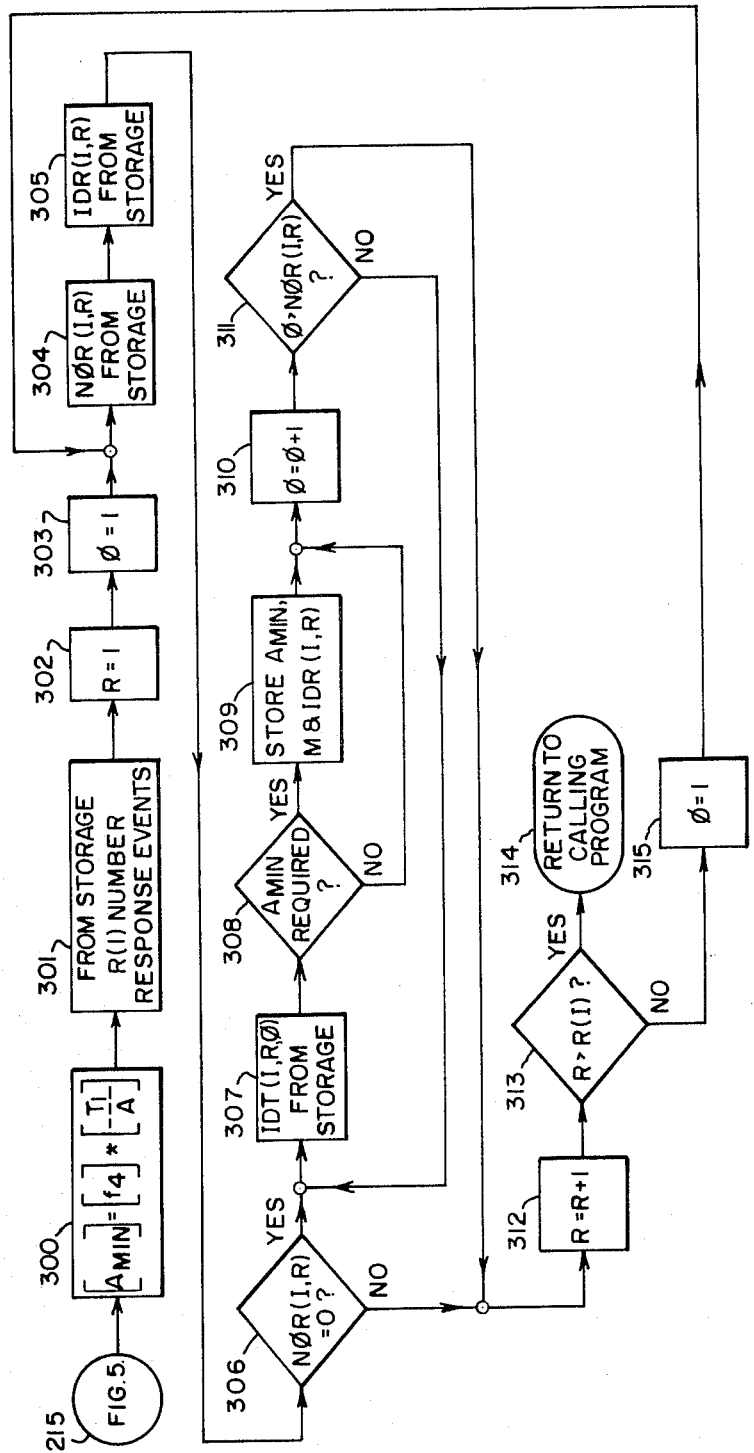
FIG. 5 illustrates a suitable flow chart program operative with the program of FIG. 3 and FIG. 4 for effecting a predetermined check for the minimum amplitude $A_{min}$ relative to all response variables associated with the response events of a given input event I.

In FIGS. 3, 4, and 5 are shown the flow charts for the input event program called as a subroutine by a program which runs in response to the occurrence of an input event. The input event program establishes the $T_{max}$ and $T_{min}$ time bound checks for the total number of response events associated with a given input event. The application program, which could be an automatic workpiece thickness control program in accordance with the descriptions of the above referenced publications for example or any other process operation application control program as well known to persons skilled in this art, supplies an input event identification number I, which has previously been assigned and is unique to that particular input event in the process. Step 100 is entered where the program reads and stores the present time $T$ as the time of the input event. In step 101 from above storage table A(I,1) for event I is obtained N(I), the total number of input variables associated with input event I, and this value is stored in core location N. In step 102 a check is made to see if this value N is nonzero. If N is nonzero, in step 103 and identification number of the Nth input event variable is gotten from above Table A(I,1), the variable is measured or accessed from a core buffer, and its value stored in an assigned core location in step 104. From step 104 the program goes to step 105 where N is decremented by 1. The program then returns to step 102 where N is checked to see if it is now nonzero. This identification, measurement, and storage process then continues until all N(I) input variables have been processed in this manner. When N is zero in step 102, the program goes to step 106 where the maximum allowable response times ($T_{max}$) for all of the associated input response events are calculated. The calculation is then made using a predetermined equation relationship as previously explained. The program then goes to step 107 where R(I), the total number of response events for the first input event I, is gotten from above storage table A(I,2) for input event I and stored in temporary location R. The program goes to step 108 where IDR-(I,R), the identification number for the associated response event R is gotten from storage table A(I,2) and stored in temporary location K. This storage location K contains data as to whether the $T_{max}$ or the $T_{min}$ check is to apply to this response event R. In step 109 a check is made to see if the maximum time check is indicated. If it is, the program goes to step 110 where L, the error message bit number for the maximum time error for response event R, is gotten from storage table B1 as shown above. This bit number is unique and corresponds to an error message stored in mass memory. This error bit in core is either zero or one, and there is an error message on the mass memory corresponding to this error bit. From step 110, the program goes to step 111 where the values K, L and the $T_{max}$ value calculated for response event R are stored in the time delay table F shown above. The program then goes to step 112 where R is decremented by 1. In step 109, if no $T_{max}$ check is indicated, the program goes directly to step 112. After R is decremented, the program proceeds to step 113 where a check is made to see if R is zero. If not, the program returns to 108 and proceeds in a loop until the $T_{max}$ check has been processed for all response events.

If R = 0 in step 113 the program goes to step 114 where the minimum time response values $T_{min}$, are calculated in accordance with a predetermined equation relationship previously explained. In step 115 R(I), the total number of response events, is again gotten from storage table A(I,2) and stored in R. In step 116 the identification number IDR(I,R) for response event R is gotten from storage Table A(I,2) and stored in location K. In step 117 a check is made to determine if response event IDR(I,R) requires a check for minimum response time $T_{min}$. If such a check is indicated, the program goes to step 118 where the calculated $T_{min}$ value for event R and its I.D. number IDR(I,R) is stored in the first available storage location in Table C. The program then goes to step 119 where R is decremented by 1. In step 120 a check is made to see if R = 0. If it does not, the program returns to step 116 where the next response identification number is taken from storage, and in step 117 a check is made to see if the next response event requires a $T_{min}$ check. The program continues until all response events for input event I have been processed and R has been found equal to 0 in step 120. The program then proceeds to step 200 of FIG. 4 where the maximum amplitude for each of the response event variables associated with input event I are established.

In step 200 of FIG. 4 $A_{max}$ is established using a predetermined equation to find the maximum allowed values of the response variables. In step 201 the program finds R(I), the total number of response events for input event I, from storage table A(I,2). In step 202 R is set equal to 1, where R is the index of the response event currently being processed. In step 203, O is set equal to 1, where O is the index of the response variable currently being processed for response event R. The program then goes to step 204 where NOR(I,R), the total number of response variables for response event R, is gotten from storage table A(I,2+R) as shown above, where there is stored the number of response variables associated with response event R and the identification number for each of these variables.

From step 204 the program proceeds to step 205 where IDR(I,R), the identification number for reponse event R is gotten from the storage table A(I,2). In step 206 a check is made to see if NOR(I,R), the number of response variables associated with response event R, is not equal to zero. If it is not equal zero, variables are associated with event R and the program proceeds to step 207 where IDT(I,R,O), the identification number of variable O associated with response event R, is gotten from storage table A(I,2+R) and stored M. In step 208 a check is made to see if variable O requires a maximum value $A_{max}$ check. If so the program goes to step 209; if not, the program goes to step 210. In step 209, the program stores in the first available location in storage table D as shown above the calculated $A_{max}$ value for O, the variable identification number M for variable O, and the event identification number IDR-(I,R) for response event R. The program then goes to step 210 where O is incremented by 1. In step 211 a check is made to see if O exceeds NOR(I,R), the total number of response variables associated with event R. If this is not true, the program returns to step 207 and processes the next variable associated with event R for the maximum amplitude check. After O is found to exceed NOR(I,R) in step 211, the program goes to step 212 where R is incremented by 1. From step 212 the program proceeds to step 213 where a check is made to see if R, the response event number, exceeds R(I), the total number of response events. If this is true, the program proceeds to the program of FIG. 5. All response variables for event I have now been processed for the maximum value $A_{max}$ check. If this is not true, the program goes to step 214 where O is set equal to 1, and the program then goes to step 204 and proceeds to process the variables associated with the next response event associated with this same input event I.

In step 300 in FIG. 5, the above predetermined equation is used to calculate the minimum allowed values $A_{min}$ of the response variable associated with input event I. The program then goes to step 301 where R(I), the total number of response events for input event I, is gotten from storage table A(I,2). In step 302, R, the index for the current response event is set to one. In step 303, O, the index of the response variable currently being processed for response event R, is set equal to one. In step 304, NOR(I,R) the total number of response variables for response R, is gotten from storage table A(I,2+R). The program then goes to step 305 where IDR(I,R), the identification number for response event R, is gotten from storage table A(I,2). In step 306 a check is made to see if NOR(I,R), the number of associated variables for event R is equal to zero. If it is, the program proceeds to step 312 and no further processing is made for event R. Otherwise, the program proceeds to step 307 where IDT(I,R,O), the identification number of variable O associated with event R is gotten from storage table A(I,2+R) and stored in M. In step 308, a check is made to see if variable O requires a minimum value $A_{min}$ check. If it does, the program goes to step 309, otherwise it goes to step 310. In step 309, in the first available location in above storage table E is stored the minimum calculated value $A_{min}$ for variable O, the identification number contained in M for variable O, and the identification number R for response event. From step 309 the program goes to step 310 where index O is incremented by one. The program then goes to step 311 where a check is made to see if index O exceeds NOR(I,R), the total number of response variables for response event R. If it does, the $A_{min}$ processing is complete for event R and the program proceeds to step 312. If not, the program returns to step 307 and continues to process the next response variable associated with response event R. In step 312 the index R is incremented by 1. In step 313 a check is made to see if index R exceeds R(I), the total number of response events associated with input event I. If this is true, the minimum value processing is complete for all response variables associated with input event I and the program goes to step 314. If not, the program goes to step 315 where index O is set equal to 1. From step 315 the program returns to step 304 and begins to process the variables for the next associated response event. At step 314 is a return to a calling application program.

Figure 6:
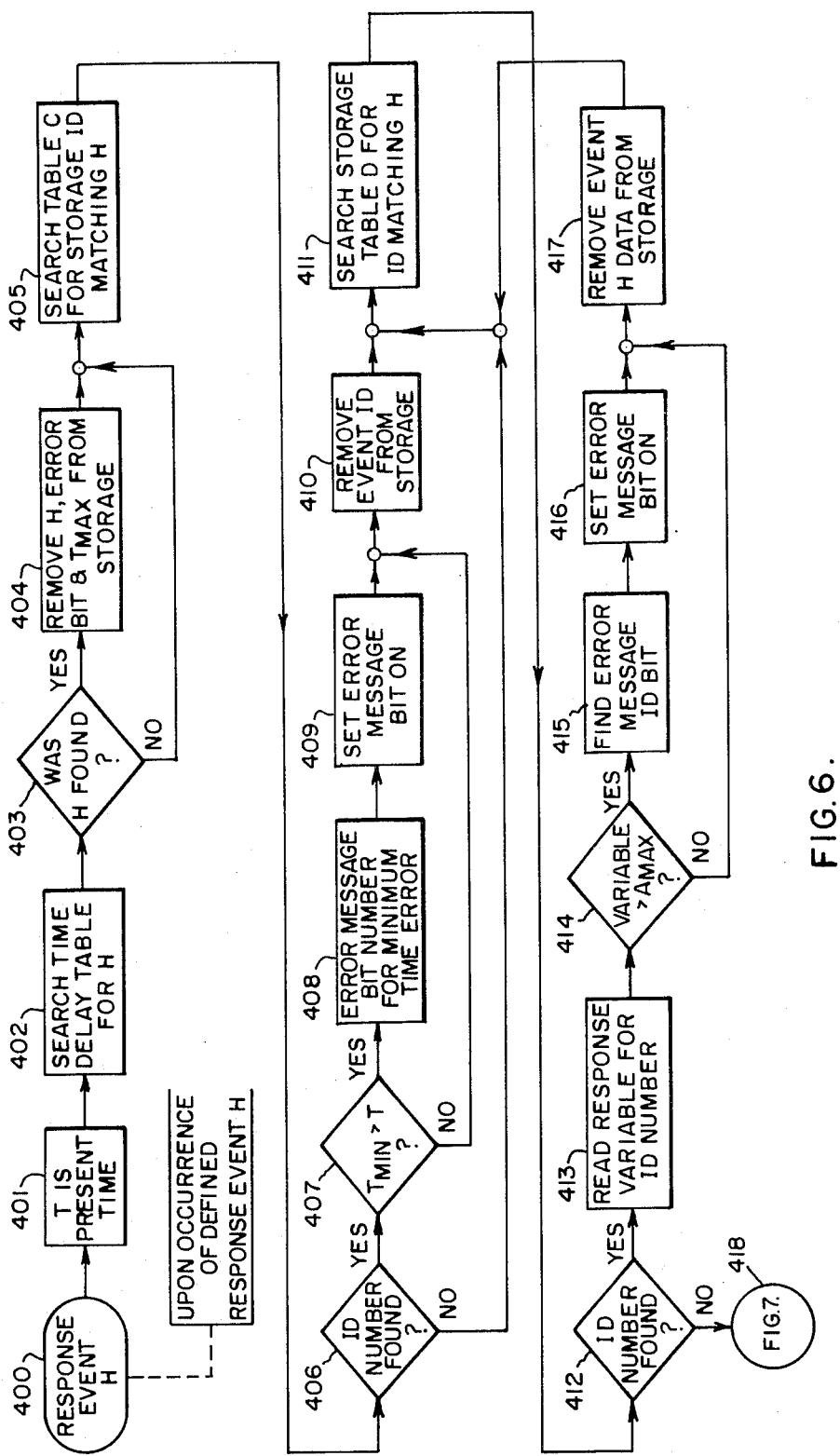
FIG. 6 illustrates a suitable logic flow chart program for operation with the process control computer shown in FIG. 1, to effect a predetermined operation relative to the occurrence of each response event which occurs at time T and associated with a given input event I and a suitable logic program to check for $A_{max}$ error relative to response variables for a given input event I.

In FIG. 6, the response event program is called as a subroutine by the application program which runs in response to the occurrence of a response event associated with input event I. The calling application program supplies a response identification number H which is unique to that particular event in the process. Step 401 is first entered where the program reads and stores the present time $T$ as the time of the response event. In step 402 the program searches the time delay table (as shown in table F) for the presence of an identification number H. In step 403 a check is made to determine if such a number has been found. If it has, the program goes to step 404 where this identification number H is removed from storage table F along with the associated error message bit number and the maximum response time $T_{max}$. No error message for a maximum time error will be provided as an output for this particular response event. The program then goes to step 405. If no identification number H has been found in step 403, the program then also goes to step 405. In step 405 a search of storage table C, containing the minimum time response information, is made for the presence of a response event identification number matching event number H. In step 406 a check is made to see if such a match has been found. If it has, the program goes to step 407 and checks if the stored minimum time response value $T_{min}$ associated with the event identification number found in table C is greater than the response event time. If it is, the program goes to step 408; if not, the program goes to step 410. In step 408 the program finds the error message bit number for a minimum response time error from table B1 as shown above. In step 409 the program requests an output of the error message by setting this error bit on. The program then goes to step 410 where the minimum time check data associated with response event H is removed from the storage table C. The program then goes to step 411 where storage table D, which contains the data associated with the maximum response variable value check, is searched for the presence of an identification number corresponding to identification number H. In step 412 a check is made to see if such an identification number has been found. If such is found, the program goes to step 413, if not the maximum value checking process is terminated and the program goes to FIG. 7. In step 413 the corresponding variable identification number to the event identification number just found in table D is accessed. The value of this identified variable is then read. From step 413 the program goes to step 414 where a check is made to see if the value of this variable is greater than the stored maximum value $A_{max}$ of this variable in table D. If it is, the program goes to step 415; otherwise, the program goes to step 417 where the data associated with event H and the identified variable is removed from table D. In step 415 the program finds in table B2 the error message identification bit number corresponding to the maximum amplitude error for the identified response variable. In step 416 an error message output is requested by setting this bit on. From 416 the program goes to step 417 where the accessed data is removed from storage table K. From step 417 the program goes to step 411 for a further search of table D. When the table search finds no more matching identification numbers, the program goes to step 418 which leads to the flow chart of FIG. 7.

In FIG. 7, step 500, the program seaches storage table E for a response event identification number equal to response event identification number H. Table E contains the storage of calculated minimum values for variables, the variable identification numbers for these variables, and the response event identification numbers associated with these variables. The program then goes to step 501 which checks to see if a response event identification number for H has been found. If so, the program goes to step 502; if not, the program goes to step 507. At step 502 the program finds the corresponding response variable identification number. This variable is then read. The program then goes to step 503 where a check is made to see if the value of the measured variable is less than the $A_{min}$ value stored for this variable in table E. If so, the program goes to step 504 where the error message bit number corresponding to a minimum value for the identified variable is gotten from table B2. From step 504 the program goes to step 505, where an error message is requested by setting this error bit on. From step 505 the program goes to step 506 where the response event I.D. number, the associated variable I.D. number and the calculated minimum value of the variable are removed from table E. If in step 503, the measured value of the variable was found to be above the minimum allowed value, the program goes directly to step 506. From 506 the program returns to step 500 to conduct another table search. If no more identification numbers matching H are found, the program goes to step 507 which is a return to the calling application program.

In FIG. 8 the time delay program is called periodically by a timing pulse from the control computer. The period of this pulse is directly related to the accuracy required in determining time response errors. This program starts at step 601, where X is set equal to the total number of error message requests stored in the time delay table. The composition of this table is shown in FIG. F. From 601 the program goes to step 602 where a check is made to see if the present time is greater than the maximum allowed time for response event X. It should be noted that this program will start with X equal to the total number of response event values stored in the time delay table, since this program runs to check maximum time errors relative to response events. This maximum time is stored in the time delay table along with the identification number for the corresponding response event X. If the present time exceeds the maximum allowed time, the program then goes to step 603 where the stored error message bit for the maximum time error for response event X is set on. This error message bit is also stored in the time delay table. From step 603 the program goes to step 604 where the information concerning response event X is removed from the time delay table. At step 605, X which was initially set equal to the total number of error requests stored in the time delay table is decremented by 1. From 605 the program returns to 601 to check all remaining error requests. If at step 602, it is determined that the maximum time for event X has not been exceeded, the program goes to step 606 where X is decremented by 1. The program then proceeds to step 607 where a check is made to see if X is zero. If it is all error message requests have been checked and the program goes to step 608 where a program stop is encountered. If not, the program returns to step 602 to check the next error message request in the time delay table.

In FIG. 9 the error message output program is called periodically from a timing pulse. The period of this pulse is again directly related to the accuracy required in determining time response errors. The purpose of this program is to facilitate the handling of large numbers of error messages and the output of these messages. To output an error message, all another program has to do is set a defined error message bit ON. The error message output program then retrieves the stored error message from mass memory and undergoes the time consuming process necessary to output the message on some display device. The program starts at step 701 where Y is set equal to the total number of error message bits in tables B1 and B2. Step 702 is then entered where the program finds the error message bit number for message Y from tables B1 and B2. From step 702 the program goes to step 703 where a check is made to see if this error bit is ON. If so, the program then goes to step 705 where the error message corresponding to this bit is read from mass memory. At step 706 this error message is output on an appropriate display device. At step 707 the present time is also output to reference the time of the error. From 707 the program goes to step 708 where Y is decremented by 1. If the error bit was off at step 703, the program would have proceeded directly to step 708. From step 708 the program goes to step 709 where a check is made to see if Y is equal to 0. If it is, the program goes to step 710 which is a program stop. If not, the program returns to step 702 to check the next error message bit.

For the example of three functional units as shown in FIG. 1, there is shown in FIG. 10 the total program logic linkage between a defined hardware unit input event, the running of the application program corresponding to that input event and the calling of the input event subroutine in the error monitor from the application program after the unique I.D. number corresponding to that input event has been assigned by the application program.

Figure 10F:
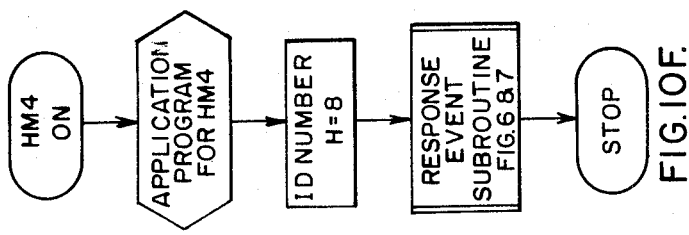
FIGS. 10A, 10B, 10C, 10D, 10E and 10F illustrate the sequencing relationship between the error monitor program, such as shown in FIGS. 3, 4 and 5 for each defined input event and as shown in FIGS. 6 and 7 for each defined response event, and the calling application program for the example of FIG. 1 in response to functional unit input event signals.
Figure 10E:
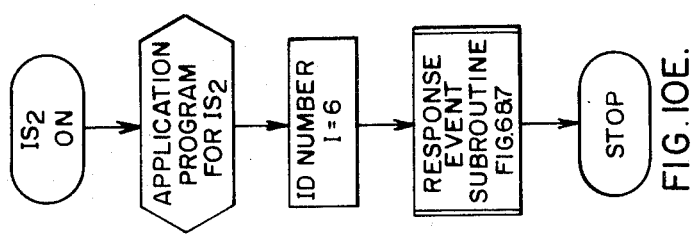
Figure 10D:
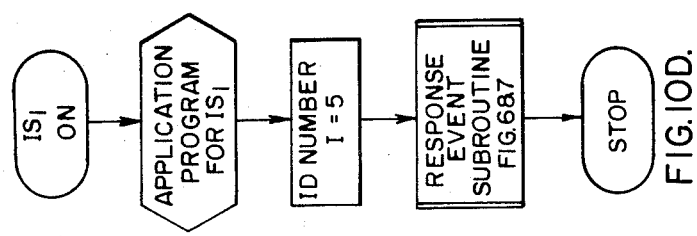
Figure 10C:
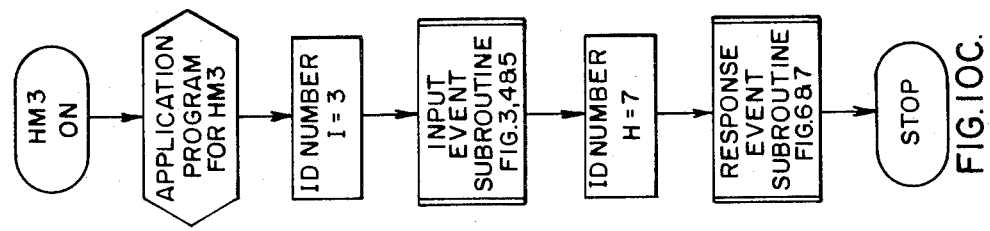
Figure 10B:
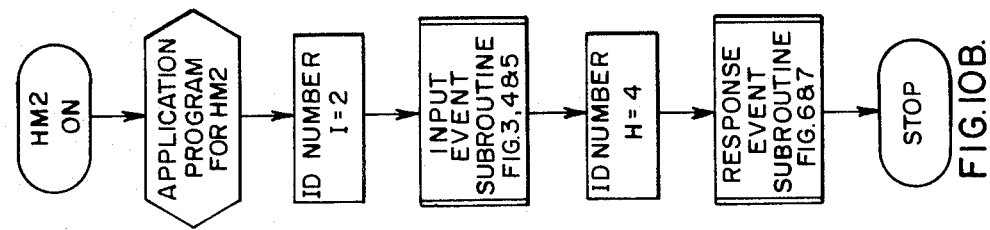
Figure 10A:
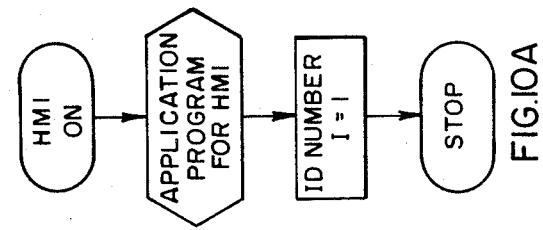

In FIG. 10a we have the logic linkage for the input event corresponding to hot metal detector HM1 ON. When the hot metal detector HM1 ON interrupt occurs, the application program for this hot metal detector is first called. After it completes running, it assigns the I.D. number I = 1 which designates that the first defined input event has occurred. After the I.D. number I is assigned, the input event subroutine of FIGS. 3, 4 and 5 is then called. After the running of the input event subroutine, the program is completed.

FIG. 10b shows the logic linkage for the second input event, or the ON interrupt of detector HM2. After this ON interrupt is received, the application program for hot metal detector HM2 is called. After this program completes running, it then assigns an I.D. number I = 2, designating that input event 2 has occured. The input event subroutine of FIGS. 3, 4 and 5 is then called. On the return from the input event subroutine, the response event I.D. number H is equal to 4, which designates that the HM2 ON interrupt in addition to being input event 2 is also responsive event 4. After H is set equal to 4, the response event subroutine of FIGS. 6 and 7 is then called. On the return from the response event subroutine, the program terminates.

FIG. 10c shows the logic linkage for the hot metal detector HM3 ON interrupt. When the hot metal detector HM3 ON interrupt occurs, the application program for this hot metal detector is called. After this program has run, it assigns the input event I.D. number I = 3 designating that predefined input event 3 has occured. The input event subroutine of FIGS. 3, 4 and 5, is then called. After the return from the input event subroutine, the response event I.D. No. H is set equal to 7 designating in this example that input event 3 is also responsive event 7. The response event subroutine of FIGS. 6 and 7 is then called, and on the return from the latter subroutine, this program terminates.

FIG. 10d shows the logic linkage between the $IS_1$ ON interrupt event and the corresponding operation of the error monitor for this event. When the $IS_1$ ON interrupt occurs, the application program for $IS_1$ is first called. On the return from application program for $IS_1$ the response event I.D. No. H is set equal to 5, thus designating $IS_1$ ON as responsive event 5. The responsive event subroutine of FIGS. 6 and 7 is then called and on return from this subroutine, the program terminates.

FIG. 10e shows the logic linkage between the $IS_2$ ON interrupt and the operation of the error monitor. When $IS_2$ ON occurs, the application program for $IS_2$ is called. On the return frm this application program, the response event I.D. number H is set equal to 6, thus designating $IS_2$ ON as response event 6. The response event subroutine of FIGS. 6 and 7 is then called, and on the return from that subroutine, the program terminates.

FIG. 10f shows the logic linkage between the hot metal detector HM4 ON interrupt and the operation of the error monitor. When the hot metal detector HM 4 ON interrupt occurs, the application program for this hot metal detector is run. This application program then sets response event I.D. number H = 8 thus designating the HM4 ON interrupt as responsive event H. After H is set equal to 8, the response event subroutine of FIGS. 6 and 7 is called. Upon return from this subroutine, the program terminates.

In FIG. 11 there is provided a chart to illustrate the relationship between the functional units 1, 2 and 3 relative to the input events, the input variables, the response events and the response variables for each of such units. For unit 1 of FIG. 1, which comprises the run in tables TABLE 1 the hot metal detector HM1 and the hot metal detector HM2, the input event is the ON interrupt signal from the hot metal detector HM1. There are no input variables for this input event and the only response event for the latter input event 1 is the HM2 ON interrupt signal; there are no response variables for this input event.

Relative to functional unit 2 which comprises the load cell, the position detector, the hot metal detector HM2 and the hot metal detector HM3, the input event 2 is the HM2 ON interrupt signal. The input variables associated with input event 2, are the desired screw position reference $S_1$ at the occurrence of the HM2 On interrupt signal, and the actual screw position feedback signal $S_2$ at the occurrence of the HM2 ON interrupt signal. The response events for the input event 2 is the $IS_2$ load cell on interrupt signal, the $IS_1$ zero error position signal for the screw apparatus and the HM3 ON interrupt signal from the hot metal detector HM3. The response variables corresponding to the latter response events are the force signal $F_1$ at the time of the $IS_2$ interrupt signal, the actual screw position reading $S_2$ at the time of the $IS_1$ interrupt signal and there is no response variable associated with the HM3 ON interrupt signal.

Relative to functional unit 3, which includes the run off tables TABLE 2 and the hot metal detectors HM3 and HM4, the input event 3 is the HM3 ON interrupt signal. There is no input variable associated with this input event 3, and the response event for the latter input event 3 is the HM4 ON interrupt signal, with no response variables for the latter responsive event.

In FIG. 12 there is provided a general illustration of a well known prior art control computer programming concept including the process control computer or central processing unit 11 operative with a process 13 (which could be the rolling mill shown in FIG. 1) and interfaced through suitable peripheral equipment 15 as presently well known to persons skilled in this art. The FIG. 12 illustration sets forth the interrelationship between hardware and software for this purpose. The control unit 17 provides basic time pulses to the timing executive 19 which supplies the real time base for starting periodic programs. The priority executive program 21 handles program requests and interrupt requests from the process and the internal interrupts, allowing those with highest priority to occupy the central processor time. Input-output executive programs 23 handle the implementation bookkeeping and execution required to get data into and out of the computer. This illustration is generally in accordance with the above referenced publication which appeared in the Jan 1965 Westinghouse Engineer by Paul E. Lego and was entitled Programming for Process Control.

LOCAL OPERATION RELATIVE TO INPUT EVENT ONE

In FIG. 3 there is provided a flow chart to illustrate the input event program operative in accordance with the teachings of the present invention and relative to the example of FIG. 1. The input event program is entered at step 100, where the time of input event 1, which is the HM1 ON interrupt signal, is noted as the present time T and input event 1 has an input event identification number 1. The present time is stored as T in step 100. In step 101 from storage table A (1,1) there is gotten N(1) the number of input variables and this is stored in location N. Input event I is now input event 1. In step 102 the question is asked does N not equal zero, and since N does equal zero in this example, the flow chart advances to step 106 where there is calculated $T_{max}$, the maximum time for the HM2 ON interrupt signal to occur, in accordance with previously explained equations. In step 107 from storage table A(1,2) is gotten R(1) the number of response events corresponding to input event 1, and this is stored in core location R. In step 108 IDR(1,1) the identification number for the single response event is gotten from storage table A(1,2) and stored in core location K. This number is found to be 4,1,1. The response identification number 4,1,1 requests a maximum time check. In step 109 this is found to be true, and the program advances to step 110, where the program sets L = 6 which is the storage table B1 error message bit number for the maximum time error for response event R which in this example is 1 for the HM2 ON interrupt signal. In step 111 the quantities K,L and the $T_{max}$ calculated in this example are stored in the time delay table F. If no other maximum time checks are in progress, the time delay table will at this time contain bit number 6, the response event identification number 4,1,1 and the corresponding calculated $T_{max}$. In program step 112 the quantity R which is 1 in this example is decremented from one to zero, since there are no other response events. The program then advances to step 114 and computes $T_{min}$, the minimum time for the HM2 ON interrupt signal to occur, from previously explained equations. In step 115, R(1) the total number of response events is gotten from storage table A(1,2) which is the number of response events. In step 116 from storage table A(1,2), is gotten IDR(1,1) the response event identification number for the first response event 1. This is 4,1,1 corresponding to the HM2 ON interrupt signal response event identification number. In step 117 a check is made to see if a minimum time check is indicated, and the program goes to step 118 since there is a minimum time check indicated. The calculated $T_{min}$ value and this response event identification number are stored in table C. If no other minimum time checks are in progress, table C will contain response event identification number 4,1,1, and the calculated minimum time $T_{min}$. The program then goes to step 119, where R is decremented from one to zero. In step 120 the check is made to see if R = 0, and since it does in this example, a check is made in FIG. 4 to see if a maximum amplitude check is in order, which it is not. A minimum amplitude check is also found to be not in order. No further calculations are made relative to the FIG. 3 flow chart. After going through the FIG. 4 flow chart and the FIG. 5 flow chart which do not provide amplitude limits for this example, the input event program stops for this input event.

LOGIC OPERATION RELATIVE TO RESPONSE EVENT FOUR

In FIG. 6 there is shown the response event program which will be described relative to response event 4, and it is assumed that the data for input event 1 is now stored. This program is entered at step 400 upon the occurrence of the HM2 ON interrupt signal. In step 401 $T$ is stored as the present time. At step 402 the time delay table F is searched for a response event identification number corresponding to 4,1,1. Assuming the prior occurrence of input event 1, and if the present time is less than the calculated $T_{max}$ for this response event, then this response event identification number will still be present in the time delay table F. If the response event I.D. number 4,1,1 is found in step 403, the program advances to step 414 where the I.D. number, and the corresponding error message bit, and the $T_{max}$ value are removed from the time delay Table F. In step 405, the storage table C is searched for a response event I.D. number 4,1,1, corresponding to the response event 4. If the maximum time has not expired, this response event I.D. number will be present and will be sensed in step 406, such that the program advances to step 407 where a check is made to see if the present time $T$ is less than the calculated $T_{min}$ value. If it is, in step 408 the program searches table B for the minimum time error bit number corresponding to the response event I.D. number 4,1,1. In the step 409 the error message bit is set to an ON state. In step 410 the response event I.D. and $T_{min}$ numbers are removed from the table C. The storage table D in step 411 is then searched for the presence of the response event I.D. number 4,1,1. Since there are no response variables for this response event, none will be found and this is the end of the flow chart operation as shown in FIG. 6.

Since there are no response variables in this example, the logic of FIG. 7 searches table E and finds no corresponding response event I.D. number, and this terminates the logic operation and returns to the calling application program.

Assume the response event HM2 ON for the input event HM1 ON does not occur before the calculated maximum time $T_{max}$. When the time delay program as shown in FIG. 8 is entered at step 601 for a timing pulse, it will begin to search the time delay table F. Assume in this example only the values for response event 4 are stored in the time delay table F. X which is the total number of error requests will be 1. At step 602 a check is made to see if the present time $T$ at the occurrence of the timing pulse is greater than the time $T_{max}$ in the storage table F. If so there is an error situation present, and in step 603 the corresponding error bit 6 stored in storage table F is set ON. The program then recycles to check tee remaining error messages.

In FIG. 9 there is shown a flow chart for the error message output program which has lowest priority and is a lengthy operation and therefore runs slowly such as every second or so.

Assume that error message bit 6 has just been set by the time delay program. At the next timing pulse for the error message output program, the output program detects that the error message bit 6 is ON and sets this bit OFF. The message corresponding to error message bit 6 is read from mass memory and sent to a suitable output device, which will then display the message "maximum time error for HM2 ON at time $T$."

LOGIC OPERATION RELATIVE TO INPUT EVENT TWO

The input event program of FIG. 3 is entered with I = 2, the HM2 ON input event I.D. number. The present time $T$ is first stored in step 100. In step 101 from the storage table A(2,1) for input event 2, there is found that N(2) is equal to two, indicating there are two associated input variables and N is set to 2. In step 102, N is found not equal to 0 and the program goes to step 103. From table A(2,1) for input event 2, is gotten S1VAR, the symbolic designator for the first associated input variable. This variable is the screw position reference. The value of S1VAR is read or accessed from the appropriate input buffer and stored in a suitable core location. In step 105 N is decremented by 1 and the program goes back to step 102 to continue the same logic operation for the remaining input variables. In step 106 the $T_{max}$ calculation for the three associated response events, in this example and as shown in FIG. 11, is made. The program then goes to step 107, where the response events associated with input event 2 are found and identified. The program then proceeds through steps 108, 109, 110, 111, 112 and 113 in the same manner as described for input event 1. In step 114, the $T_{min}$ calculation is made for the response events and the program proceeds through steps 115, 116, 117, 118, 119 and 120 in the same manner as described for input event 1.

At step 200 in FIG. 4 the maximum amplitude computations begin. At step 200 the $A_{max}$ computations are made for the response variables, in this example and as shown in FIG. 11, associated with the response events for input event 2. At step 201 is gotten R(2) the number of response events for input event 2 from table A(2,2). R(2) is set equal to 3 the number of response events. At step 202 index R is set to 1, and at step 203 index O is set to 1. At step 204 is gotten from storage table A(2,3) the number of response variables associated with the first response event in the storage table for input event 2. NOR(2,1) the number of response variables is equal to 1. At step 205 is gotten the I.D. number IDR(2,1) for the first response event, which then equals 5,1,1. At step 206 a check is made to see if NOR(2,1) is not equal to 0. As NOR(2,1) is equal to 1, the program proceeds to step 207 where the I.D. number of the first variable associated with the first response event for input event 2 is gotten from table A(2,3) for input event 2; this value is F1VAR(1,1), the I.D. number for the force variable, which is stored in M. At step 208 the program looks at this variable I.D. number to see if an $A_{max}$ check is indicated. If an $A_{max}$ check for the force is not indicated, the program would proceed to step 210. In step 209, the $A_{max}$ value for the first variable, the I.D. number for this variable, and the I.D. number for the response event for this variable is stored in temporary storage table D. The program then goes to step 210 where O, the index of the response variables for the first response event for input event 2, is incremented by 1. At step 211 a check is made to see if O exceeds the total number of rsponse variables for the first response event. Since there is one response variable for the first response event for input event 2, O would exceed the total number of response variables and the program would go to step 212. If there were more respone variables associated with the first response event, the program would cyclically proceed through steps 207, 208, 209 and 210, identifying the response variables and storing the required datas in storage table D. At step 211 when it has been determined that all response variables associated with the Rth response event for input event 2 have been processed, the program proceeds to step 212 where R, the index of the response events for input event 2 is incremented by 1. The program then goes to step 213 where a check is made to see if R, the index of the current response event for input event 2, is greater than R(2), the total number of response events for input event 2. If R < R(2) the program proceeds to step 214 where O the index of the variables associated with the response event of index R is set to 1. From step 214 the program goes to step 204 and cyclically proceeds to process all response variables associated with the response event of index R.

The second response event for input event 2 is $IS_1$ ON. There is one response variable S2VAR(1,1) the screw position reading for the second response event. The variable I.D., its $A_{max}$ value, and the second response event I.D. are stored in storage table D. There are no response variables for the third response event HM3 ON, associated with input event 2.

In step 213 when it has been found that all response events have been processed, the program proceeds to the minimum amplitude processing. After the maximum amplitude processing for input event 2 is complte, storage table D will have the following data stored in it:

| Response Event I.D. | Associated Variable | $A_{max}$ |
|---|---|---|
| Storage | I.D. Storage | |
| 5,1,1 | F1VAR(1,1) | $A_{max}$ for force |
| 6,1,1 | S2VAR(1,1) | $A_{max}$ for screw reading |

After maximum amplitude processing for input event 2 is complete, the program proceeds to step 300 on FIG. 5 to begin the minimum amplitude processing. The minimum amplitude processing is substantially identical regarding the logic operations involved to the maximum amplitude processing for input event 2 and for this reason will not be described in detail. The end result of this processing is the storage in storage table E of the calculated $T_{min}$ values and the associated variable I.D. and response event I.D. numbers. After the minimum amplitude processing, storage table E will have the following data stored in it:

| Response Event I.D. | Associated Variable | $A_{min}$ |
|---|---|---|
| Storage | I.D. Storage | |
| 5,1,1 | F1VAR(1,1) | $A_{min}$ for force |
| 6,1,1 | S2VAR(1,1) | $A_{min}$ for screw reading |

LOGIC OPERATION RELATIVE TO RESPONSE EVENT FIVE

The response event subroutine is entered in FIG. 6 with H = 5,1,1 the I.D. number for the pressductor ON response event. At step 401 the present time $T$ is stored. Steps 402, 403, 404, 405, 406, 407, 408, 409 and 410 are the logical operations for the minimum time error checks and are logically identical to the operations described in the previous response event 2 for example. At step 411 begins the check for maximum value errors. At step 411 a search is made in table D, the storage table for maximum values of response variables, for a response I.D. number equal to 5,1,1. At step 412 a check is made to see if such a match has been found. If no match is found, there are no response variables associated with response event 5 for which a maximum amplitude check is to be made. If a match is found, however, the program goes to step 413 where the variable I.D. and $A_{max}$ value corresponding to the identified response I.D. are gotten from table D. The value of the response variable is then read or accessed. At step 414 a check is made to determine if the calculated $A_{max}$ value is exceeded by the value of the response variable. If input event 2 has occurred previously, a match for the response event I.D. 5,1,1 will be found in storage table D. This response variable I.D., F1VAR(1,1) and the $A_{max}$ for the force signal are associated with this response event I.D. If a maximum value error is found, at step 415 storage table B2 will be searched to find the error bit number for the maximum value error for the identified response vairable. In the case of a maximum value error for the force, bit No. 17 will be found. At step 416 an error message is requested for this error by setting this bit ON. At step 417 the $A_{max}$ data, the response event I.D. and the response variable I.D. are removed from storage table D. The program then returns to step 411 to search for any more matching response I.D. numbers in storage table D. After all indicated maximum amplitude checks are made for response event 5,1,1 the program goes to step 500 of FIG. 7 to make the minimum amplitude checks for this response event.

The minimum amplitude checks are substantially identical regarding the logic involved to the maximum amplitude checks, and for this reason will not be described in detail. Storage table E is searched for response event I.D. values matching 5,1,1. The variables for which the minimum value check is indicated are read and their values checked. If a minimum value error is found, the appropriate error message is requested. After the check is made, the data is removed from storage table E.

One substantial advantage of the present invention is the fact that this error monitor operation is extremely simple to program because there are certain predetermined functional units to be monitored, and this can be established to include all the operational errors of the dynamic process that warrant the effort made to monitor them. The error monitor can then place a request immediately for an error message or if desired at some future time when a particular response event should occur. A dynamic process is usually described in terms of predetermined ordered events within defined functional units. For the identified set of events within each defined functional unit, the desired error conditions can be checked. It is also possible to define software functional units with ordered input-output properties, and maximum and/or minimum timing requirements such that the error monitor program can then be used to check these software functional units. After all desired functional units have been defined in the entire mill process operation, for example 200 such units, a related number of error situations can be monitored. For example, in a hot strip mill several hundred error cases would be expected. The amount of programming required for complete documentation of the control errors can be substantial and calls for systematic treatment of message outpus.

To handle this requirement the error message program has been devised to work in conjunction with the error monitor program. This latter program runs periodically and scans an error bit storage matrix. In this storage matrix there is provided a unique error bit associated with each specified error condition in the mill control. The error bit is utilized, when it is set ON, to output the desired correlated error message alarm.

The output message program has a periodic scan which checks all these possible error condition bits and then resets the previously set error bits. Each bit is reset to OFF that was initially set ON by the error monitor program; with each bit set ON corresponding to the fact that a functional unit error condition that was monitored has occurred.

When the error monitor requests an error message at some time in the future, it does so by requesting that the predetermined and associated error bit in this matrix be set after a specified time delay. If the correct response event occurs, the error monitor simply cancels the request to set the error bit if the time delay is still in progress. The error ouput program in the latter situation does not sense the setting of an error bit and therefore does not effect the actual printing of the associated error message. In this way a large error monitoring system can be handled with minimal coordinated programming effort.

After the error monitor program establishes approximate $T_{max}$ and $T_{min}$ limits and/or $A_{max}$ and $A_{min}$ limits, these limits are stored in respective time limit and amplitude limit storage tables. Then a time delay program runs periodically as determined by a clock within the computer to count down the $T_{max}$ time delay tables. When the response event occurs, a $T_{min}$ check is made if it is required. If the time delay program counts down the $T_{max}$ limit stored in the table before a response event occurs, then an error condition exits. At the time of a response event, if amplitude checks are required, the actual value of the response event variable signal is compared with the stored $A_{max}$ and $A_{min}$ values, and any variable outside of desired limits causes the indication of an error condition.

Two programs that run off timing pulses are involved, such that one program sets the error bit to request an error message and one program outputs the error message and cancels the error bit setting. The error bit matrix is in effect a table of core locations that are initially set OFF, and can be set ON by the error monitor program. The upper limit of the time delay interval is determined by calculation or as an upper limit constant, as is true for the minimum time limit and the upper and lower amplitude limits, which control the provision of an error message.

The error output message program runs periodically and checks all the error message bits. There is periodically a scan of the error bit matrix to see if there is an error bit tht is still set. If there are none the error output program stops; and if there are, the set bit is selected with the highest priority (perhaps an error in the first stand pressductor is more important than a hot metal detector), higher priority error bits are in the higher priority location and lower priority error bits are in the lower priority locations, the predetermined error output message associated with this set error bit is read from mass memory and output, and since the same error may again appear a short time later, once the error bit is read it is reset to OFF.

In accordance with the teachings of the present invention, there are four programs which operate dynamically relative to each other, and would normally be on several priority levels. These are the error monitor program, which includes an input event program and a response event program, and a time delay program and an error message program. The time delay program normally operates at the highest priority level because it normally has the lowest duty cycle and when it runs the timing accuracy of that program determines the timing accurary of the entire monitoring function with respect to maximum time errors. The message output program normally has the lowest priority, becuase it handles time consuming message outputs. The two remaining programs normally have a priority level in between these other programs.

It is generally known and understood by persons skilled in this particular art of applying a process control computer system such as shown in FIG. 1, that a combined hardware and software process control computer system comprises a special purpose extended control computer machine, and is provided when a general purpose computer is operated under the control of a software instruction program, such as illustrated by the logic operation flow charts of FIGS. 3 to 9. Such a process control computer system can be built if desired using hardware or wired logic programming, in view of the recognized general equivalence of a software programming embodiment and a hardware programming embodiment of substantially the same control system. However, when an involved industrial application such as here described becomes somewhat complex, the economics tend to favor the software approach due to the greater expense and lack of flexibility when logic circuits, sch as well known NOR logic circuits, are wired together to provide the desired hardware programming circuit arrangement built up of such logic circuits to perform the sequential program steps set forth in the illustrated flow charts.

We claim as our invention:

1. In industrial process operation monitoring apparatus including a programmed digital computer and responsive to the occurrence of at least one sequential process event in relation to a predetermined functional unit, with each said functional unit having at least one defined input event and at least one related response event, that combination of means operative with said industrial process for providing a first input signal in response to the occurrence of said one input event of a given functional unit, means operative with said industrial process for providing a second input signal in response to the occurrence of said one response event for said given functional unit, and means including said programmed digital computer for establishing the desired operational maximum and minimum limits relative to a predetermined value parameter for each response event related to said input event and for providing a predetermined output signal related to the operation of said industrial process when said one response event was not within said desired operational limits.

2. The industrial process operation monitoring apparatus of claim 1,
  with said means including said programmed digital computer being operative to establish desired operational maximum time limit $T_{max}$ and minimum time limit $T_{min}$ relative to the sensed occurrence time of said second input signal related to said input event,
  and with said means including said programmed digital computer being operative to compare the sensed occurrence time of said second input signal with said established limits $T_{max}$ and $T_{min}$ to determine that said one response event was within said desired operational limits 3. The industrial process operation monitoring apparatus of claim 1,
  with said means including said programmed digital computer establishing the desired operational maximum time limit $T_{max}$ and minimum time limit $T_{min}$ relative to a predetermined occurrence time To $+\Delta T$ for each response event related to the occurrence time To of said input event and where $\Delta T$ is a predetermined time delay between said time To and the occurrence time of each said response event.

4. The industrial process operation monitoring apparatus of claim 1,
  with said means including said programmed digital computer establishing the desired operational maximum time limit $T_{max}$ and minimum time limit $T_{min}$ relative to a predetermined time value parameter for each response event related to said input event,
  and with said means including said programmed digital computer comparing said time value parameter with said limits $T_{max}$ and $T_{min}$ for determining that each said response event was within said desired operational limits.

5. The industrial process operation monitoring apparatus of claim 1,
  with said means for providing a predetermined output signal being operative to request a predetermined error indication message be provided when said response event was not within said desired operational limits.

6. In apparatus for monitoring a dynamic industrial process including at least one predetermined unit of sequentially operative happenings,
  means operative with said industrial process for providing a first input signal in response to a first of said happenings within each said one unit,
  means operative with said industrial process for providing a second input signal in response to at least one second happening within said one unit and related to a first happening within the same unit, and
  means for establishing a desired predictive relationship between said first happening and said second happening within said one unit and responsive to the provision of said first input signal and said second input signal for providing an output signal in response to said first input signal and in relation to said desired predictive relationship.

7. The apparatus for monitoring a dynamic industrial process of claim 6,
  with said means for establishing a desired predictive relationship being responsive to a defined input event as said first happening within each said unit for establishing a desired predictive relationship wth at least one defined response event as said second happening within that same unit,
  and with said predictive relationship being in regard to the time occurrence of said first input signal in relation to said input event and the time occurrence of said second input signal in relation to said response event.

8. The apparatus for monitoring a dynamic industrial process of claim 6,
  with said means for establishing a desired predictive relationship being operative to make an amplitude comparison in relation to at least one second happening within that same unit, where the amplitude of that second happening is compared to a predetermined reference amplitude for that second happening.

9. The apparatus for monitoring a dynamic industrial process of claim 6,
  with said means for establishing a desired predictive relationship being responsive to the occurrence time To of a defined input event as said first happening and establishing a desired predictive relationship To $+\Delta T$ with at least one second happening within that same unit, where that second happening is a defined response event associated with said input event and predicted to occur relative to said input event after a time delay $\Delta T$.

10. In a method of monitoring the operation of a dynamic industrial process including a plurality of defined units of sequential events, the steps of
  providing a first input signal upon the occurrence of a first of said events,
  providing a second input signal upon the occurrence of a second of said events,
  establishing a predetermined predictive relationship between said first event and at least said second said event within that same defined unit of events,
  requesting the provision of an output signal indication for each said unit in response to said first of said events and in relation to the satisfaction of said predictive relationship, and
  establishing for at least said second event within each unit of events that said predictive relationship is satisfied for preventing the provision of said output signal indication when said predictive relationship is satisfied.

11. The method of monitoring the operation of a dynamic industrial process of claim 10,
  with said step of establishing a predetermined predictive relationship being operative to establish a first time interval between the occurrence of said first of said events and the predicted occurrence of said second of said events,
  with said step of establishing that said predictive relationship is satisfied being operative to establish a second time interval between the occurrence of said first of said events and the actual occurrence of said second of said events,
  and with said step of requesting the provision of an output signal indication being operative to prevent the provision of an output signal indication of a determined error condition in the operation of said dynamic process when said predictive relationship is satisfied by a comparison of the first time interval with the second time interval.

12. The method of monitoring the operation of a dynamic industrial process of claim 10, with said step of establishing a predetermined predictive relationship being operative to establish in regard to the occurrence time of said first input signal a predictive relationship in regard to the occurrence time of said second input signal within the same defined unit of events.

13. The method of monitoring the operation of a dynamic industrial process of claim 10, including a plurality of defined units of sequential events, with said step of establishing for at least said second event within each unit of events a comparison of the said predictive relationship with the occurrence time of said second input signal in relation to said second event to determine that said predictive relationship is satisfied by that occurrence time being within said predictive relationship.

14. The method of monitoring the operation of a dynamic industrial process of claim 10, with said step of requesting the provision of an output signal indication being operative to request a process operation error output signal indication and to determine the actual provision of said error output signal indication when a predetermined characteristic of at least said second event within each unit of events does not occur in a desired manner to satisfy said predictive relationship.

15. In the method of monitoring the operation of a dynamic industrial process having a plurality of defined units, with each said unit including first and second related events and with said second event having a measurable variable, the steps of
providing a first input signal in relation to the sensed occurrence of said first event for each said unit,
measuring the value of said variable,
requesting the provision of an output signal indication for each said unit in response to said first input signal,
establishing the operational limits of a predictive value for said measured variable of said second event in relation to the occurrence of said first event for each said unit,
establishing the relationship between the measured value of said variable and said operational limits of said predictive value to determine when said measured value is within said operational limits, and
providing an output signal indication for each said unit in relation to said measured value being within said operational limits.

16. The method of monitoring the operation of a dynamic industrial process of claim 15, said method including the steps of,
providing a second input signal in relation to the sensed occurrence of said second event for each said unit,
determining a time interval between the occurrence of said first input signal and the occurrence of said second input signal,
and providing said output signal indication of an error condition in the operation of said dynamic process only when said time interval has a predetermined difference in comparison with at least one of established operational maximum and minimum time limits.

17. The method of monitoring the operation of a dynamic industrial process of claim 15, with said step of establishing the operational limits of a predictive value for said measured variable being operative to establish operational amplitude limits relative to the amplitude value of said variable.

18. The method of monitoring the operation of a dynamic industrial process of claim 15, with the step of establishing the operational limits being operative to establish operation amplitude limits of at least one of the maximum amplitude limit and the minimum amplitude limit, and with said step of requesting the provision of an output signal indication being operative to provide said output signal indication only when the amplitude of said measured variable is not within at least one of said operational amplitude limits.

19. The method of monitoring the operation of a dynamic industrial process of claim 15, with said step of establishing the operational limits being operative to predictively specify the amplitude value limits for said measured variable, and with said step of requesting the provision of an output signal indication being operative to compare the actual amplitude value of said measured variable with the predictively specified amplitude value limits to determine the provision of said indication.

20. An operation monitoring apparatus for a dynamic industrial process having a plurality of functional units, with each functional unit including at least one response event associated with an input event, said monitoring apparatus comprising,
means for providing a first input signal in relation to said input event,
means for providing a second input signal in relation to one response event,
means for determining for each said functional unit a time delay interval between the occurrence of said second input signal related to said one response event after the occurrence of said first input signal related to said input event,
means for comparing for each said functional unit said time delay interval with at least one of a predetermined maximum time interval $T_{max}$ and a predetermined minimum time interval $T_{min}$, and
means for providing an error condition output signal indication for a detected error condition for at least one said functional unit when the time delay interval is one of greater than a predetermined maximum time interval and less than a predetermined minimum time interval.

21. The operation monitoring apparatus for a dynamic industrial process of claim 20, with said means for providing an error condition output signal indication being operative to correct the operation of said dynamic process relative to said detected error condition.

22. The operation monitoring apparatus for a dynamic industrial process of claim 20, said monitor apparatus including
means for requesting that a predetermined error message be displayed in relation to said output signal indication at a predetermined time if said means for comparing establishes that the time delay interval is one of greater than said maximum time interval or less than said minimum time interval.

23. The operation monitoring apparatus for a dynamic industrial process of claim 20, with said means for providing an error condition output signal indication being operative when the desired sequence of the occurrence of said events is not followed due to the failure of said response event to occur as desired.

24. The operation monitoring apparatus of claim 20, with said monitoring apparatus including,
means for determining a first time $T_1$ when at least said first input signal in relation to said input event occurs,
means for determining a second time $T_2$ when at least said second input signal in relation to said one response event occurs,
and with said means for determining for each said functional unit a time delay interval being operative with said first time $T_1$ and said second time $T_2$.

25. The operation monitoring apparatus of claim 24, with said means for determining for each said functional unit a time delay interval being operative to establish a time delay interval $\Delta T$ in accordance with the relationship $T_2 - T_1 = \Delta T$.

26. The operation monitoring apparatus of claim 25, said monitoring apparatus including,
means for comparing said time delay interval $\Delta T$ with at least one of a predetermined maximum time limit or a minimum time limit to establish that said error condition is present.

27. The operation monitoring apparatus of claim 20, said monitoring apparatus including means for determining for each said functional unit the amplitude of at least said second input signal related to said one response event, and
means for comparing for each said functional unit said amplitude with predetermined amplitude limits to establish that an operational error condition is present.

28. A monitor apparatus for a dynamic industrial process operative in a plurality of functional units, with each of said units having an input event and at least one associated response event, said apparatus comprising, means for providing for each functional unit a first input signal in relation to said input event,
means for providing for each functional unit a second input signal in relation to said one response event, means for determining for each functional unit a first time interval between the occurrence of said first input signal related to said input event and the actual occurrence of at least said second input signal related to said one response event associated with that input event,
means for establishing for each functional unit at least a second time interval in accordance with a desired relationship between the occurrence of said first input signal related to said input event and the desired occurrence of at least said second input signal related to said one response event associated with that input event, and
means for providing for each functional unit an output signal indication of a predetermined error condition relative to the operation of said dynamic process, with said error condition being determined by said first time interval being one of greater than said second time interval or less than said second time interval.

29. The monitor apparatus for a dynamic industrial process of claim 28, with said means for establishing at least a second time interval being operative to establish one of a maximum time interval or a minimum time interval, and
with said means for providing an output signal indication of a predetermined error condition being operative to determine said error condition when said first time interval is one of greater than the maximum time interval or less than the minimum time interval.

30. A method of monitoring a dynamic industrial process operative in at least one functional unit, with said one unit having an input event and at least one associated response event, said method including the steps of,
providing a first input signal in relation to said input event,
providing a second input signal in relation to said one associated response event,
establishing a comparison for said functional unit for each response event between said first and second input signals in regard to at least one of a predetermined maximum time interval and a predetermined minimum time interval,
determining an error condition for said functional unit in the operation of said dynamic process by said comparison when the time delay interval between the occurrence of said input event and said resonse event is one of greater than said maximum time interval or less than said minimum time interval, and
providing an output signal indication for said functional unit of a determined error condition when said error condition has been determined to have occurred.

31. The method of monitoring a dynamic industrial process of claim 30, with said functional unit having at least one response variable associated with each response event and with the amplitude of said second input signal being related to the amplitude of said one response variable, said method including the steps of, establishing a second comparison for said functional unit for each response variable in regard to at least one of a predetermined maximum amplitude and a predetermined minimum amplitude of said second input signal,
determining a second error condition for said functional unit in the operation of said dynamic process by said second comparison when the amplitude of said second input signal is one of greater than said maximum amplitude or less than said minimum amplitude, and
providing for an output signal indication for said functional unit of a determined error condition when one of said error conditions has been determined to have occurred.

32. The method of monitoring a dynamic industrial process of claim 30, with said step of establishing a comparison for each response event being in regard to at least one of a maximum time interval $T_{max}$ and a minimum time interval $T_{min}$ relative to said time delay interval between the occurrence of each said response event after the occurrence of said input event.

33. A method of monitoring the operation of a dynamic industrial process having at least one defined functional unit, with said functional unit including an input event and an associated response event, said method comprising the steps of, sensing the occurrence time of said input event, sensing the occurrence time of said associated response event, determining for said functional unit at least one time delay for comparison with at least one of a maximum time interval and a minimum time interval between the occurrence time of said input event followed by the occurrence time of said response event, requesting for said functional unit a process operation error output signal indication to be provided, and comparing for said functional unit said time delay with at least one of said maximum time interval and said minimum time interval to control the provision of said requested error output signal indication.

34. The method of monitoring the operation of a dynamic industrial process of claim 33, with said input event occurring at time To and with said step of determining at least one time delay being in accordance with a desired relationship To + $\Delta$T between input event time To and the time delay interval $\Delta$T between the occurrence time of said input event followed by the occurrence time of said response event.

35. The method of monitoring the operation of a dynamic industrial process of claim 33, with said step of determining at least one time delay being in accordance with at least one of a maximum time interval limit $T_{max}$ and a minimum time interval limit $T_{min}$, respectively, and where To is the occurrence time of the input event and $\Delta$T is the desired time interval between the occurrence time of said input event and the occurrence time of said response event.

36. The method of monitoring the operation of a dynamic industrial process of claim 33, with said step of determining at least one time delay being operative to predict a desired relationship between the occurrence time of said input event followed by the occurrence time of said response event, and including the step of determining for said functional unit at least one second time delay in accordance with the relationship between the actual occurrence time of said input event followed by the actual time occurrence of said response event, and with said step of comparing being operative to compare the respective time delays to control the provision of said requested error output signal indication.

* * * * *